US009785773B2

(12) United States Patent
Falk et al.

(10) Patent No.: US 9,785,773 B2
(45) Date of Patent: *Oct. 10, 2017

(54) MALWARE DATA ITEM ANALYSIS

(71) Applicant: Palantir Technologies Inc., Palo Alto, CA (US)

(72) Inventors: Matthew Falk, New York, NY (US); Timothy Yousaf, New York, NY (US); Joseph Staehle, New York, NY (US); Lucas Lemanowicz, New York, NY (US); Sebastien Noury, London (GB); Robin Lim, Mountain View, CA (US); Michael Glazer, San Francisco, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 14/668,833

(22) Filed: Mar. 25, 2015

(65) Prior Publication Data

US 2016/0004864 A1    Jan. 7, 2016

Related U.S. Application Data

(63) Continuation of application No. 14/473,860, filed on Aug. 29, 2014, now Pat. No. 9,021,260.
(Continued)

(51) Int. Cl.
*G06F 21/56* (2013.01)
*H04L 29/06* (2006.01)
*G06F 21/62* (2013.01)

(52) U.S. Cl.
CPC .......... *G06F 21/56* (2013.01); *G06F 21/6209* (2013.01); *G06F 21/6218* (2013.01); *G06F 2221/034* (2013.01); *H04L 63/105* (2013.01)

(58) Field of Classification Search
CPC .. G06F 21/56; G06F 21/6209; G06F 21/6218; G06F 2221/21131; H04L 63/1051; H04L 9/088
(Continued)

(56) References Cited

U.S. PATENT DOCUMENTS 5,109,399 A    4/1992   Thompson
5,329,108 A    7/1994   Lamoure
(Continued)

FOREIGN PATENT DOCUMENTS

CN    101729531    6/2010
CN    103281301    9/2013
(Continued)

OTHER PUBLICATIONS

Official Communication in British Application No. GB1408025.3 dated Nov. 6, 2014.
(Continued)

*Primary Examiner* — Hadi Armouche
*Assistant Examiner* — Shahriar Zarrineh
(74) *Attorney, Agent, or Firm* — Knobbe, Martens, Olson & Bear, LLP

(57) ABSTRACT

Embodiments of the present disclosure relate to a data analysis system that may automatically analyze a suspected malware file, or group of files. Automatic analysis of the suspected malware file(s) may include one or more automatic analysis techniques. Automatic analysis of may include production and gathering of various items of information related to the suspected malware file(s) including, for example, calculated hashes, file properties, academic analysis information, file execution information, third-party analysis information, and/or the like. The analysis information may be automatically associated with the suspected malware file(s), and a user interface may be generated in
(Continued)

which the various analysis information items are presented to a human analyst such that the analyst may quickly and efficiently evaluate the suspected malware file(s). For example, the analyst may quickly determine one or more characteristics of the suspected malware file(s), whether or not the file(s) is malware, and/or a threat level of the file(s).

20 Claims, 13 Drawing Sheets

Related U.S. Application Data

(60) Provisional application No. 62/020,905, filed on Jul. 3, 2014.

(58) Field of Classification Search
USPC .......................................................... 713/165
See application file for complete search history.

(56) References Cited

U.S. PATENT DOCUMENTS

| | | | |
|---|---|---|---|
| 5,548,749 A | 8/1996 | Kroenke et al. |
| 5,632,009 A | 5/1997 | Rao et al. |
| 5,670,987 A | 9/1997 | Doi et al. |
| 5,708,828 A | 1/1998 | Coleman |
| 5,765,171 A | 6/1998 | Gehani et al. |
| 5,781,704 A | 7/1998 | Rossmo |
| 5,845,300 A | 12/1998 | Comer |
| 5,870,761 A | 2/1999 | Demers et al. |
| 6,057,757 A | 5/2000 | Arrowsmith et al. |
| 6,091,956 A | 7/2000 | Hollenberg |
| 6,098,078 A | 8/2000 | Gehani et al. |
| 6,161,098 A | 12/2000 | Wallman |
| 6,190,053 B1 | 2/2001 | Stahlecker et al. |
| 6,202,085 B1 | 3/2001 | Benson et al. |
| 6,216,140 B1 | 4/2001 | Kramer |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,317,754 B1 | 11/2001 | Peng |
| 6,341,310 B1 | 1/2002 | Leshem et al. |
| 6,366,933 B1 | 4/2002 | Ball et al. |
| 6,369,835 B1 | 4/2002 | Lin |
| 6,374,252 B1 | 4/2002 | Althoff et al. |
| 6,456,997 B1 | 9/2002 | Shukla |
| 6,539,381 B1 | 3/2003 | Prasad et al. |
| 6,549,944 B1 | 4/2003 | Weinberg et al. |
| 6,560,620 B1 | 5/2003 | Ching |
| 6,567,936 B1 | 5/2003 | Yang et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,714,936 B1 | 3/2004 | Nevin, III |
| 6,775,675 B1 | 8/2004 | Nwabueze et al. |
| 6,807,569 B1 | 10/2004 | Bhimani et al. |
| 6,816,941 B1 | 11/2004 | Carlson et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,072,911 B1 | 7/2006 | Doman |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,167,877 B2 | 1/2007 | Balogh et al. |
| 7,168,039 B2 | 1/2007 | Bertram |
| 7,171,427 B2 | 1/2007 | Witkowski et al. |
| 7,225,468 B2 | 5/2007 | Waisman et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,373,669 B2 | 5/2008 | Eisen |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,437,664 B2 | 10/2008 | Borson |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,546,245 B2 | 6/2009 | Surpin |
| 7,558,677 B2 | 7/2009 | Jones |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,640,173 B2 | 12/2009 | Surpin et al. |
| 7,676,788 B1 | 3/2010 | Ousterhout et al. |
| 7,703,021 B1 | 4/2010 | Flam |
| 7,712,049 B2 | 5/2010 | Williams et al. |
| 7,716,067 B2 | 5/2010 | Surpin et al. |
| 7,716,077 B1 | 5/2010 | Mikurak |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,783,658 B1 | 8/2010 | Bayliss |
| 7,805,457 B1 | 9/2010 | Viola et al. |
| 7,809,703 B2 | 10/2010 | Balabhadrapatruni et al. |
| 7,814,102 B2 | 10/2010 | Miller et al. |
| 7,818,297 B2 | 10/2010 | Peleg et al. |
| 7,818,658 B2 | 10/2010 | Chen |
| 7,877,421 B2 | 1/2011 | Berger et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,010,886 B2 | 8/2011 | Gusmorino et al. |
| 8,015,151 B2 | 9/2011 | Lier et al. |
| 8,015,487 B2 | 9/2011 | Roy et al. |
| 8,019,709 B2 | 9/2011 | Norton et al. |
| 8,024,778 B2 | 9/2011 | Cash et al. |
| 8,036,632 B1 | 10/2011 | Cona et al. |
| 8,046,362 B2 | 10/2011 | Bayliss |
| 8,082,172 B2 | 12/2011 | Chao et al. |
| 8,103,543 B1 | 1/2012 | Zwicky |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,185,819 B2 | 5/2012 | Sah et al. |
| 8,196,184 B2 | 6/2012 | Amirov et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |

(56) References Cited

U.S. PATENT DOCUMENTS

| | | |
|---|---|---|
| 8,230,333 B2 | 7/2012 | Decherd et al. |
| 8,239,668 B1 | 8/2012 | Chen et al. |
| 8,266,168 B2 | 9/2012 | Bayliss |
| 8,280,880 B1 | 10/2012 | Aymeloglu et al. |
| 8,290,942 B2 | 10/2012 | Jones et al. |
| 8,290,990 B2 | 10/2012 | Drath et al. |
| 8,301,464 B1 | 10/2012 | Cave et al. |
| 8,301,904 B1 | 10/2012 | Gryaznov |
| 8,302,193 B1 * | 10/2012 | Gardner .................. G06F 21/56 707/758 |
| 8,312,367 B2 | 11/2012 | Foster |
| 8,312,546 B2 | 11/2012 | Alme |
| 8,316,060 B1 | 11/2012 | Snyder et al. |
| 8,321,943 B1 | 11/2012 | Walters et al. |
| 8,347,398 B1 | 1/2013 | Weber |
| 8,352,881 B2 | 1/2013 | Champion et al. |
| 8,368,695 B2 | 2/2013 | Howell et al. |
| 8,380,659 B2 | 2/2013 | Zunger |
| 8,397,171 B2 | 3/2013 | Klassen et al. |
| 8,411,046 B2 | 4/2013 | Kruzensiki et al. |
| 8,412,707 B1 | 4/2013 | Mianji |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,484,168 B2 | 7/2013 | Bayliss |
| 8,489,331 B2 | 7/2013 | Kopf et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,514,082 B2 | 8/2013 | Cova et al. |
| 8,515,207 B2 | 8/2013 | Chau |
| 8,515,912 B2 | 8/2013 | Garrod et al. |
| 8,527,461 B2 | 9/2013 | Ducott, III et al. |
| 8,554,579 B2 | 10/2013 | Tribble et al. |
| 8,554,709 B2 | 10/2013 | Goodson et al. |
| 8,577,911 B1 | 11/2013 | Stepinski et al. |
| 8,589,273 B2 | 11/2013 | Creeden et al. |
| 8,600,872 B1 | 12/2013 | Yan |
| 8,620,641 B1 | 12/2013 | Farnsworth et al. |
| 8,621,634 B2 * | 12/2013 | Turbin .................. G06F 21/562 706/62 |
| 8,646,080 B2 | 2/2014 | Williamson et al. |
| 8,639,757 B1 | 3/2014 | Adams et al. |
| 8,676,597 B2 | 3/2014 | Buehler et al. |
| 8,683,322 B1 | 3/2014 | Cooper |
| 8,688,749 B1 | 4/2014 | Ducott, III et al. |
| 8,689,108 B1 | 4/2014 | Duffield et al. |
| 8,695,097 B1 | 4/2014 | Mathes et al. |
| 8,707,185 B2 | 4/2014 | Robinson et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,756,224 B2 | 6/2014 | Dassa et al. |
| 8,781,169 B2 | 7/2014 | Jackson et al. |
| 8,787,939 B2 | 7/2014 | Papakipos et al. |
| 8,788,405 B1 | 7/2014 | Sprague et al. |
| 8,788,407 B1 | 7/2014 | Singh et al. |
| 8,799,799 B1 | 8/2014 | Cervelli et al. |
| 8,799,812 B2 | 8/2014 | Parker |
| 8,806,625 B1 * | 8/2014 | Berger .................. H04L 9/3236 711/118 |
| 8,812,960 B1 | 8/2014 | Sun et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,832,832 B1 | 9/2014 | Visbal et al. |
| 8,868,486 B2 | 10/2014 | Tamayo |
| 8,868,537 B1 | 10/2014 | Colgrove et al. |
| 8,898,788 B1 * | 11/2014 | Aziz ..................... G06F 21/00 726/23 |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 9,027,140 B1 * | 5/2015 | Watkins ............. G06Q 30/0277 709/219 |
| 9,112,850 B1 | 8/2015 | Eisen |
| 9,244,679 B1 * | 1/2016 | Arellano .................. G06F 8/71 |
| 9,311,479 B1 * | 4/2016 | Manni ..................... G06F 21/56 |
| 9,323,863 B2 * | 4/2016 | Krajec ............. G06F 17/30958 |
| 9,336,389 B1 * | 5/2016 | Okereke ................. G06F 21/56 |
| 9,361,353 B1 * | 6/2016 | Aristides ........... G06F 17/30828 |
| 9,367,687 B1 * | 6/2016 | Warshenbrot ......... G06F 21/566 |
| 9,413,721 B2 * | 8/2016 | Morris .................. G06F 21/56 |
| 2001/0021936 A1 | 9/2001 | Bertram |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2003/0028560 A1 | 2/2003 | Kudrolli et al. |
| 2003/0039948 A1 | 2/2003 | Donahue |
| 2003/0084017 A1 | 5/2003 | Ordille |
| 2003/0088654 A1 | 5/2003 | Good et al. |
| 2003/0097330 A1 | 5/2003 | Hillmer et al. |
| 2003/0144868 A1 | 7/2003 | MacIntyre et al. |
| 2003/0163352 A1 | 8/2003 | Surpin et al. |
| 2003/0182313 A1 | 9/2003 | Federwisch et al. |
| 2003/0187932 A1 * | 10/2003 | Kennedy ................. H04L 63/10 709/205 |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0103124 A1 | 5/2004 | Kupkova |
| 2004/0111390 A1 | 6/2004 | Saito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0153418 A1 | 8/2004 | Hanweck |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0205524 A1 | 10/2004 | Richter et al. |
| 2004/0250124 A1 | 12/2004 | Chesla et al. |
| 2004/0260702 A1 | 12/2004 | Cragun et al. |
| 2005/0027705 A1 | 2/2005 | Sadri et al. |
| 2005/0028094 A1 | 2/2005 | Allyn |
| 2005/0080769 A1 | 4/2005 | Gemmell |
| 2005/0086207 A1 | 4/2005 | Heuer et al. |
| 2005/0125715 A1 | 6/2005 | Franco et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0193024 A1 | 9/2005 | Beyer et al. |
| 2005/0222928 A1 | 10/2005 | Steier et al. |
| 2005/0229256 A2 | 10/2005 | Banzhof |
| 2005/0246327 A1 | 11/2005 | Yeung et al. |
| 2005/0251786 A1 | 11/2005 | Citron et al. |
| 2005/0262556 A1 | 11/2005 | Waisman et al. |
| 2006/0020599 A1 * | 1/2006 | Martin ................. G06F 21/6218 |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0069912 A1 | 3/2006 | Zheng et al. |
| 2006/0074866 A1 | 4/2006 | Chamberlain et al. |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0149596 A1 | 7/2006 | Surpin et al. |
| 2006/0155945 A1 | 7/2006 | McGarvey |

(56) References Cited

U.S. PATENT DOCUMENTS

| | | |
|---|---|---|
| 2006/0190497 A1 | 8/2006 | Inturi et al. |
| 2006/0203337 A1 | 9/2006 | White |
| 2006/0206866 A1 | 9/2006 | Eldrige et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0265747 A1 | 11/2006 | Judge |
| 2006/0271277 A1 | 11/2006 | Hu et al. |
| 2006/0279630 A1 | 12/2006 | Aggarwal et al. |
| 2007/0005707 A1 | 1/2007 | Teodosiu et al. |
| 2007/0011150 A1 | 1/2007 | Frank |
| 2007/0016363 A1 | 1/2007 | Huang et al. |
| 2007/0026373 A1 | 2/2007 | Suriyanarayanan et al. |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0112887 A1 | 5/2007 | Liu et al. |
| 2007/0168516 A1 | 7/2007 | Liu et al. |
| 2007/0174760 A1 | 7/2007 | Chamberlain et al. |
| 2007/0180075 A1 | 8/2007 | Chasman et al. |
| 2007/0192265 A1 | 8/2007 | Chopin et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0220067 A1 | 9/2007 | Suriyanarayanan et al. |
| 2007/0220328 A1 | 9/2007 | Liu et al. |
| 2007/0233756 A1 | 10/2007 | D'Souza et al. |
| 2007/0240062 A1 | 10/2007 | Christena et al. |
| 2007/0266336 A1 | 11/2007 | Nojima et al. |
| 2007/0294200 A1 | 12/2007 | Au |
| 2007/0294643 A1 | 12/2007 | Kyle |
| 2007/0294766 A1 | 12/2007 | Mir et al. |
| 2007/0299887 A1 | 12/2007 | Novik et al. |
| 2008/0027981 A1 | 1/2008 | Wahl |
| 2008/0033753 A1 | 2/2008 | Canda et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0086718 A1 | 4/2008 | Bostick et al. |
| 2008/0104019 A1 | 5/2008 | Nath |
| 2008/0126951 A1 | 5/2008 | Sood et al. |
| 2008/0133567 A1 | 6/2008 | Ames et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0229422 A1 | 9/2008 | Hudis et al. |
| 2008/0243951 A1 | 10/2008 | Webman et al. |
| 2008/0255973 A1 | 10/2008 | El Wade et al. |
| 2008/0263468 A1 | 10/2008 | Cappione et al. |
| 2008/0263669 A1* | 10/2008 | Alme ................ G06F 21/56 726/24 |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2008/0320299 A1 | 12/2008 | Wobber et al. |
| 2009/0002492 A1 | 1/2009 | Velipasalar et al. |
| 2009/0018940 A1 | 1/2009 | Wang et al. |
| 2009/0027418 A1 | 1/2009 | Maru et al. |
| 2009/0030915 A1 | 1/2009 | Winter et al. |
| 2009/0044279 A1 | 2/2009 | Crawford et al. |
| 2009/0055251 A1 | 2/2009 | Shah et al. |
| 2009/0076845 A1 | 3/2009 | Bellin et al. |
| 2009/0083184 A1 | 3/2009 | Eisen |
| 2009/0088964 A1 | 4/2009 | Schaaf et al. |
| 2009/0103442 A1 | 4/2009 | Douville |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0192957 A1 | 7/2009 | Subramanian et al. |
| 2009/0199090 A1 | 8/2009 | Poston et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0281839 A1 | 11/2009 | Lynn et al. |
| 2009/0285483 A1* | 11/2009 | Guven ................ G06Q 30/016 382/181 |
| 2009/0287470 A1 | 11/2009 | Farnsworth et al. |
| 2009/0292626 A1 | 11/2009 | Oxford |
| 2009/0328222 A1 | 12/2009 | Helman et al. |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070897 A1 | 3/2010 | Aymeloglu et al. |
| 2010/0077481 A1 | 3/2010 | Polyakov et al. |
| 2010/0077483 A1 | 3/2010 | Stolfo et al. |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0145909 A1 | 6/2010 | Ngo |
| 2010/0162176 A1 | 6/2010 | Dunton |
| 2010/0185691 A1 | 7/2010 | Irmak et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0287084 A1* | 11/2010 | Roberts ................ G06Q 40/06 705/35 |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0321399 A1 | 12/2010 | Ellren et al. |
| 2010/0323829 A1* | 12/2010 | Cross .................... A63B 59/70 473/560 |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0010342 A1 | 1/2011 | Chen et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0087519 A1 | 4/2011 | Fordyce, III et al. |
| 2011/0107424 A1* | 5/2011 | Singh ................ G06F 17/30109 726/24 |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0178842 A1 | 7/2011 | Rane et al. |

(56) References Cited

U.S. PATENT DOCUMENTS

| | | |
|---|---|---|
| 2011/0208724 A1 | 8/2011 | Jones et al. |
| 2011/0218934 A1 | 9/2011 | Elser |
| 2011/0219450 A1* | 9/2011 | McDougal ............... G06F 21/56 726/23 |
| 2011/0225198 A1 | 9/2011 | Edwards et al. |
| 2011/0231223 A1 | 9/2011 | Winters |
| 2011/0238510 A1 | 9/2011 | Rowen et al. |
| 2011/0238570 A1 | 9/2011 | Li et al. |
| 2011/0258158 A1 | 10/2011 | Resende et al. |
| 2011/0270705 A1 | 11/2011 | Parker |
| 2011/0291851 A1 | 12/2011 | Whisenant |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2012/0002839 A1* | 1/2012 | Niemela ............ G06K 9/00973 382/100 |
| 2012/0005159 A1 | 1/2012 | Wang et al. |
| 2012/0019559 A1 | 1/2012 | Siler et al. |
| 2012/0036013 A1 | 2/2012 | Neuhaus et al. |
| 2012/0036106 A1 | 2/2012 | Desai et al. |
| 2012/0036434 A1 | 2/2012 | Oberstein |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0079596 A1* | 3/2012 | Thomas .................. G06F 21/55 726/24 |
| 2012/0084135 A1 | 4/2012 | Nissan et al. |
| 2012/0084866 A1 | 4/2012 | Stolfo |
| 2012/0106801 A1 | 5/2012 | Jackson |
| 2012/0110633 A1 | 5/2012 | An et al. |
| 2012/0110674 A1 | 5/2012 | Belani et al. |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0215898 A1 | 8/2012 | Shah et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1* | 10/2012 | McDougal ............ G06F 21/567 726/24 |
| 2012/0290879 A1 | 11/2012 | Shibuya et al. |
| 2012/0296907 A1 | 11/2012 | Long et al. |
| 2012/0304244 A1* | 11/2012 | Xie ........................ G06F 21/00 726/1 |
| 2012/0310831 A1 | 12/2012 | Harris et al. |
| 2012/0310838 A1 | 12/2012 | Harris et al. |
| 2012/0323888 A1 | 12/2012 | Osann, Jr. |
| 2012/0330801 A1* | 12/2012 | McDougal ............ G06F 21/577 705/32 |
| 2012/0330973 A1 | 12/2012 | Ghuneim et al. |
| 2013/0006725 A1 | 1/2013 | Simanek et al. |
| 2013/0019306 A1 | 1/2013 | Lagar-Cavilla et al. |
| 2013/0024307 A1 | 1/2013 | Fuerstenberg et al. |
| 2013/0024339 A1 | 1/2013 | Choudhuri et al. |
| 2013/0046842 A1 | 2/2013 | Muntz et al. |
| 2013/0055338 A1* | 2/2013 | McDougal ............... G06F 21/56 726/1 |
| 2013/0060786 A1 | 3/2013 | Serrano et al. |
| 2013/0061169 A1 | 3/2013 | Pearcy et al. |
| 2013/0067017 A1 | 3/2013 | Carriere et al. |
| 2013/0073377 A1 | 3/2013 | Heath |
| 2013/0073454 A1 | 3/2013 | Busch |
| 2013/0078943 A1 | 3/2013 | Biage et al. |
| 2013/0097482 A1 | 4/2013 | Marantz et al. |
| 2013/0101159 A1 | 4/2013 | Chao et al. |
| 2013/0111320 A1 | 5/2013 | Campbell et al. |
| 2013/0117651 A1 | 5/2013 | Waldman et al. |
| 2013/0139260 A1* | 5/2013 | McDougal .......... H04L 63/1433 726/23 |
| 2013/0139268 A1 | 5/2013 | An et al. |
| 2013/0145470 A1* | 6/2013 | Richard ................ G06F 21/562 726/24 |
| 2013/0150004 A1 | 6/2013 | Rosen |
| 2013/0151148 A1 | 6/2013 | Parundekar et al. |
| 2013/0152202 A1* | 6/2013 | Pak ........................ G06F 21/56 726/24 |
| 2013/0157234 A1 | 6/2013 | Gulli et al. |
| 2013/0160120 A1 | 6/2013 | Malaviya et al. |
| 2013/0173540 A1 | 7/2013 | Qian et al. |
| 2013/0176321 A1 | 7/2013 | Mitchell et al. |
| 2013/0179420 A1 | 7/2013 | Park et al. |
| 2013/0191336 A1 | 7/2013 | Ducott et al. |
| 2013/0211985 A1 | 8/2013 | Clark et al. |
| 2013/0224696 A1 | 8/2013 | Wolfe et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0268520 A1 | 10/2013 | Fisher et al. |
| 2013/0276117 A1* | 10/2013 | Hwang .................. G06F 21/564 726/23 |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0311375 A1 | 11/2013 | Priebatsch |
| 2013/0318594 A1 | 11/2013 | Hoy et al. |
| 2013/0339218 A1 | 12/2013 | Subramanian et al. |
| 2013/0346444 A1 | 12/2013 | Makkar et al. |
| 2014/0006109 A1 | 1/2014 | Callioni et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040182 A1 | 2/2014 | Gilder et al. |
| 2014/0040371 A1 | 2/2014 | Gurevich et al. |
| 2014/0040714 A1 | 2/2014 | Siegel et al. |
| 2014/0047357 A1 | 2/2014 | Alfaro et al. |
| 2014/0059038 A1 | 2/2014 | McPherson et al. |
| 2014/0059683 A1 | 2/2014 | Ashley |
| 2014/0068487 A1 | 3/2014 | Steiger et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0114972 A1 | 4/2014 | Ducott et al. |
| 2014/0123279 A1* | 5/2014 | Bishop ................ H04L 63/1491 726/23 |
| 2014/0129518 A1 | 5/2014 | Ducott et al. |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0267294 A1 | 9/2014 | Ma |
| 2014/0267295 A1 | 9/2014 | Sharma |
| 2014/0279824 A1 | 9/2014 | Tamayo |
| 2014/0310282 A1 | 10/2014 | Sprague et al. |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0366132 A1 | 12/2014 | Stiansen et al. |
| 2015/0019394 A1 | 1/2015 | Unser et al. |
| 2015/0046870 A1 | 2/2015 | Goldenberg et al. |
| 2015/0089424 A1 | 3/2015 | Duffield et al. |
| 2015/0096024 A1* | 4/2015 | Haq ..................... H04L 63/145 726/23 |

(56) References Cited

U.S. PATENT DOCUMENTS

2016/0300216 A1 10/2016 Godsey et al.
2017/0053115 A1 2/2017 Healy et al.

FOREIGN PATENT DOCUMENTS

| | | |
|---|---|---|
| DE | 10 2014 103 482 | 9/2014 |
| DE | 102014215621 | 2/2015 |
| EP | 0 816 968 | 1/1996 |
| EP | 1 191 463 | 3/2002 |
| EP | 1 672 527 | 6/2006 |
| EP | 2 551 799 | 1/2013 |
| EP | 2 778 977 | 9/2014 |
| EP | 2 778 983 | 9/2014 |
| EP | 2 779 082 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| GB | 2 516 155 | 1/2015 |
| GB | 2518745 | 4/2015 |
| NL | 2012778 | 11/2014 |
| NL | 2013306 | 2/2015 |
| WO | WO 00/009529 | 2/2000 |
| WO | WO 2005/104736 | 11/2005 |
| WO | WO 2008/011728 | 1/2008 |
| WO | WO 2009/061501 | 5/2009 |
| WO | WO 2010/000014 | 1/2010 |
| WO | WO 2010/030913 | 3/2010 |
| WO | WO 2011/161565 | 12/2011 |
| WO | WO 2012/009397 | 1/2012 |
| WO | WO 2013/010157 | 1/2013 |
| WO | WO 2013/102892 | 7/2013 |
| WO | WO 2013/126281 | 8/2013 |

OTHER PUBLICATIONS

Official Communication in New Zealand Application No. 622513 dated Apr. 3, 2014.
Official Communication in New Zealand Application No. 628161 dated Aug. 25, 2014.
Palmas, et al., "An Edge-Bundling Layout for Interactive Parallel Coordinates," Proceedings of the 2014 IEEE Pacific Visualization Symposium, Mar. 2014, pp. 57-64.
Baker et al., "The Development of a Common Enumeration of Vulnerabilities and Exposures," Presented at the Second International Workshop on Recent Advances in Intrusion Detection, Sep. 7-9, 1999, pp. 35.
Crosby et al., "Efficient Data Structures for Tamper-Evident Logging," Department of Computer Science, Rice University, 2009, pp. 17.
European Search Report in Application No. 13152370.6, dated Jun. 3, 2013.
European Search Report in Application No. 14159535.5, dated May 22, 2014.
International Search Report and Written Opinion in Application No. PCT/US2011/043794, dated Feb. 24, 2012.
Lee et al., "A Data Mining and CIDF Based Approach for Detecting Novel and Distributed Intrusions," Lecture Notes in Computer Science, vol. 1907 Nov. 11, 2000, pp. 49-65.
Official Communication in New Zealand Application No. 612705, dated Jul. 9, 2013.
Official Communication in Australian Application No. 2012238282, dated Jan. 30, 2014.
Official Communication in Australian Application No. 2012238282, dated Jun. 6, 2014.
Official Communication in New Zealand Application No. 624212, dated May 5, 2014.
Official Communication in European Application No. EP 14158861.6, dated Jun. 16, 2014.
Official Communication in New Zealand Application No. 622517, dated Apr. 3, 2014.
Official Communication in New Zealand Application No. 624557, dated May 14, 2014.
Official Communication in New Zealand Application No. 628585, dated Aug. 26, 2014.
Official Communication in New Zealand Application No. 628495, dated Aug. 19, 2014.
Official Communication in New Zealand Application No. 628263, dated Aug. 12, 2014.
Official Communication in Great Britain Application No. 1404457.2, dated Aug. 14, 2014.
Official Communication in New Zealand Application No. 622181, dated Mar. 24, 2014.
Official Communication in New Zealand Application No. 627962, dated Aug. 5, 2014.
Official Communication in New Zealand Application No. 628840, dated Aug. 28, 2014.
Official Communication in European Patent Application No. 14159464.8 dated Jul. 31, 2014.
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
Acklen, Laura, "Absolute Beginner's Guide to Microsoft Word 2003," Dec. 24, 2003, pp. 15-18, 34-41, 308-316.
Alfred, Rayner "Summarizing Relational Data Using Semi-Supervised Genetic Algorithm-Based Clustering Techniques", Journal of Computer Science, 2010, vol. 6, No. 7, pp. 775-784.
Ananiev et al., "The New Modality API," http://web.archive.org/web/20061211011958/http://java.sun.com/developer/technicalArticles/J2SE/Desktop/javase6/modality/, Jan. 21, 2006, pp. 8.
Bluttman et al., "Excel Formulas and Functions for Dummies," 2005, Wiley Publishing, Inc., pp. 280, 284-286.
Bugzilla@Mozilla, "Bug 18726—[feature] Long-click means of invoking contextual menus not supported," http://bugzilla.mozilla.org/show_bug.cgi?id=18726, printed Jun. 13, 2013 in 11 pages.
Canese et al., "Chapter 2: PubMed: The Bibliographic Database," The NCBI Handbook, Oct. 2002, pp. 1-10.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Conner, Nancy, "Google Apps: The Missing Manual," Sharing and Collaborating on Documents, May 1, 2008, pp. 93-97, 106-113 & 120-121.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
FireEye, http://www.fireeye.com/ printed Jun. 30, 2014 in 2 pages.
FireEye—Products and Solutions Overview, http://www.fireeye.com/products-and-solutions printed Jun. 30, 2014 in 3 pages.
GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Goswami, Gautam, "Quite 'Writely' Said!" One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al., "Analyzing Social Media Networks with NodeXL: Insights from a Connected World", Elsevier Science, Sep. 2010, Ch. 4 & 10, pp. 53-67 & 143-164.
Hibbert et al., "Prediction of Shopping Behavior Using a Huff Model Within a GIS Framework," Healthy Eating in Context, Mar. 18, 2011, pp. 16.

(56) References Cited

OTHER PUBLICATIONS

Holliday, JoAnne, "Replicated Database Recovery using Multicast Communication," IEEE 2002, pp. 11.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: An Open RDF Infrastructure for Shared WEB Annotations", Computer Networks, 2002, vol. 39, pp. 589-608.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Lamport, "Time, Clocks and the Ordering of Events in a Distributed System," Communications of the ACM, Jul. 1978, vol. 21, No. 7, pp. 558-565.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Loeliger, Jon, "Version Control with Git," O'Reilly, May 2009, pp. 330.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, http://msdn.microsoft.com/en-us/library/ff604039%28v=office.14%29.aspx printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mizrachi, Ilene, "Chapter 1: GenBank: The Nuckeotide Sequence Database," The NCBI Handbook, Oct. 2002, pp. 1-14.
O'Sullivan, Bryan, "Making Sense of Revision Control Systems," Communications of the ACM, Sep. 2009, vol. 52, No. 9, pp. 57-62.
Parker, Jr. et al., "Detection of Mutual Inconsistency in Distributed Systems," IEEE Transactions in Software Engineering, May 1983, vol. SE-9, No. 3, pp. 241-247.
Rouse, Margaret, "OLAP Cube," http://searchdatamanagement.techtarget.com/definition/OLAP-cube, Apr. 28, 2012, pp. 16.
Shah, Chintan, "Periodic Connections to Control Server Offer New Way to Detect Botnets," Oct. 24, 2013 in 6 pages, http://www.blogs.mcafee.com/mcaffe-labs/periodic-links-to-control-server-offer-new-way-to-detect-botnets.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
VirusTotal—About, http://www.virustotal.com/en/about/ printed Jun. 30, 2014 in 8 pages.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Definition "Identify" downloaded Jan. 22, 2015, 1 page.
Definition "Overlay" downloaded Jan. 22, 2015, 1 page.
Glaab et al., "EnrichNet: Network-Based Gene Set Enrichment Analysis," Bioinformatics 28.18 (2012): pp. i451-i457.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hur et al., "SciMiner: web-based literature mining tool for target identification and functional enrichment analysis," Bioinformatics 25.6 (2009): pp. 838-840.
Nierman, "Evaluating Structural Similarity in XML Documents," 2002, 6 pages.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Wikipedia, "Federated Database System," Sep. 7, 2013, retrieved from the internet on Jan. 27, 2015 http://en.wikipedia.org/w/index/php?title=Federated_database_system&oldid=571954221.
Yang et al., "HTML Page Analysis Based on Visual Cues," 2001, pp. 859-864.
Zheng et al., "GOEAST: a web-based software toolkit for Gene Ontology enrichment analysis," Nucleic acids research 36.suppl 2 (2008): pp. W385-W363.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/268,964 dated Dec. 3, 2014.
Notice of Allowance for U.S. Appl. No. 14/473,860 dated Jan. 5, 2015.
Notice of Allowance for U.S. Appl. No. 14/192,767 dated Dec. 16, 2014.
Notice of Allowance for U.S. Appl. No. 14/294,098 dated Dec. 29, 2014.
Official Communication for Great Britain Patent Application No. 1404574.4 dated Dec. 18, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for European Patent Application No. 14180281.9 dated Jan. 26, 2015.
Official Communication for European Patent Application No. 14187996.5 dated Feb. 12, 2015.
Official Communication for European Patent Application No. 14180142.3 dated Feb. 6, 2015.
Official Communication for European Patent Application No. 14186225.0 dated Feb. 13, 2015.

(56) References Cited

OTHER PUBLICATIONS

Official Communication for European Patent Application No. 14189344.6 dated Feb. 20, 2015.
Official Communication for Australian Patent Application No. 2014201511 dated Feb. 27, 2015.
Official Communication for European Patent Application No. 14189347.9 dated Mar. 4, 2015.
Official Communication for European Patent Application No. 14199182.8 dated Mar. 13, 2015.
Official Communication for Australian Patent Application No. 2014202442 dated Mar. 19, 2015.
Official Communication for U.S. Appl. No. 14/289,596 dated Jul. 18, 2014.
Official Communication for U.S. Appl. No. 14/289,599 dated Jul. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/225,084 dated Sep. 2, 2014.
Official Communication for U.S. Appl. No. 14/294,098 dated Aug. 15, 2014.
Official Communication for U.S. Appl. No. 14/148,568 dated Oct. 22, 2014.
Official Communication for U.S. Appl. No. 14/225,006 dated Sep. 10, 2014.
Official Communication for U.S. Appl. No. 14/294,098 dated Nov. 6, 2014.
Official Communication for U.S. Appl. No. 14/306,138 dated Sep. 23, 2014.
Official Communication for U.S. Appl. No. 14/306,154 dated Sep. 9, 2014.
Official Communication for U.S. Appl. No. 14/306,147 dated Sep. 9, 2014.
Official Communication for U.S. Appl. No. 14/319,765 dated Nov. 25, 2014.
Official Communication for U.S. Appl. No. 14/323,935 dated Nov. 28, 2014.
Official Communication for U.S. Appl. No. 14/326,738 dated Dec. 2, 2014.
Official Communication for U.S. Appl. No. 14/225,160 dated Oct. 22, 2014.
Official Communication for U.S. Appl. No. 14/504,103 dated Feb. 5, 2015.
Official Communication for U.S. Appl. No. 14/289,596 dated Jan. 26, 2015.
Official Communication for U.S. Appl. No. 14/319,765 dated Feb. 4, 2015.
Official Communication for U.S. Appl. No. 14/225,160 dated Feb. 11, 2015.
Official Communication for U.S. Appl. No. 14/306,138 dated Feb. 18, 2015.
Official Communication for U.S. Appl. No. 14/306,147 dated Feb. 19, 2015.
Official Communication for U.S. Appl. No. 14/225,084 dated Feb. 20, 2015.
Official Communication for U.S. Appl. No. 14/225,006 dated Feb. 27, 2015.
Official Communication for U.S. Appl. No. 14/473,552 dated Feb. 24, 2015.
Official Communication for U.S. Appl. No. 14/486,991 dated Mar. 10, 2015.
Official Communication for U.S. Appl. No. 14/306,154 dated Mar. 11, 2015.
Official Communication for U.S. Appl. No. 13/831,791 dated Mar. 4, 2015.
Official Communication for U.S. Appl. No. 14/504,103 dated Mar. 31, 2015.
Official Communication for U.S. Appl. No. 14/323,935 dated Mar. 31, 2015.
Official Communication for U.S. Appl. No. 14/326,738 dated Mar. 31, 2015.
Official Communication for U.S. Appl. No. 14/280,490 dated Jul. 24, 2014.
Official Communication for U.S. Appl. No. 14/479,863 dated Dec. 26, 2014.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 15/235,551 dated Nov. 2, 2016.
Official Communication for U.S. Appl. No. 15/235,551 dated Jan. 30, 2017.
Official Communication for New Zealand Patent Application No. 622513 dated Apr. 3, 2014.
Official Communication for European Patent Application No. 15175106.2 dated Nov. 5, 2015.

* cited by examiner

FIG. 2A

Creating New Submission — 202

Submit | Add to Graph — 206

File Submission Form — 204

- File: suspicious_file.temp [Choose File]
- Case Name: Example Case
- Data Received: May 9, 2014 2:45 UTC
- Source's Team: Team 1
- Source's Name: John
- Submitter Name: Administrator Account

FIG. 2B

| Viewing Ticket - suspicious_file.temp |
|---|

[Export] [Edit] [Save] [Add to Graph] [Export Malware] [Refresh External Analysis]

─ Analysis ─── 212
  Case Name:        Legal Demo
  Assigned To:
  Workflow Status:  New
  File Name:        suspicious_file.temp
  File Type:
  First Submitted:  suspicious_file.temp
  Rating:
  Malware Family:

─ Details ─── 214
  MD5:      F125B1B67BBA840EA5AB3CBC1F5D9E1E
  SHA-1:    7429C85D0E0F3843A562633E3856B7D2C739BE1F
  SHA-256:  4B9B915E72CA0C6065D71E48B22A76C773B89CF5405TDCF1AF7D7B6A0B5627B6
  SS Deep:
  Size:     65847 B
  ─ Description ─

218

[Indicators] Notes | Related Files and Submissions | External Analysis | Internal Threat Intelligence
─ 220

─ Network ─
  google.com

─ Filesystem ─
  written: c:\users\payload.exe
  modified: c:\Administrator\passwords.db ─ Registry ─
  modified: HKEY_LOCAL_MACHINE\Security\important_key

Last Submitted: April 16, 2014 14:34:06 -04:00

| Indicators | Notes | Related Files and Submissions | External Analysis | Internal Threat Intelligence |

[ VirusTotal | FireEye ]

Vendor Score: 46/50          McAfee Result: Generic.qx

| Indicators | AntiVirus Detection | FileSystem Ops | Registries | Processes | Services | Windows | Exit Tool |

| Key | Value |
|---|---|
| first_seen | 2013-10-21 15:10:33 |
| last_seen | 2013-12-09 19:53:04 |
| scan_date | 2014-03-06 10:35:29 |
| ssdeep | 768:F8xj6n71Xj/899999999QjuKKCMfxr... |
| times_submitted | 35 |
| type | Win32 EXE |
| tags | ["peexe"] |

| Indicator Type | Indicator |
|---|---|
| udp | 213.123.0.137:1035 |
| udp | 24.234.227.235:1657 |
| dns | 68.233.249.83 |
| tcp | 68.233.249.83:443 |
| udp | 213.123.0.137:1035 |
| udp | 24.234.227.235:1657 |
| dns | osw3.com |
| tcp | 68.233.249.83:443 |
| submission name | voice_message_10212013.exe |
| submission name | eeda5092075a03e979aaee5d00d5d4d... |
| submission name | 0f34f68c29ba34646495aa067791e0786d... |
| submission name | voice_message_10212013.exe |
| submission name | voice_message_10212013.exexx |
| submission name | voice_message_10212013.ex. |
| submission name | eeda5092075a03e979aaee5d00d5d4dc |
| submission name | file-6106757_vir |
| submission name | voice_message_10212013.vir |
| submission name | voicemail_10212013.exe. |
| submission name | voice_message_10212013.exe.MALICIO... |
| submission name | /tmp/c-c16df-402-13823868203 |

FIG. 2E

Last Submitted: April 16, 2014 14:34:06 -04:00   Vendor Score: 46/50   McAfee Result: Generic.cx

[VirusTotal] [FireEye]

[Indicators | Notes | Related Files and Submissions | External Analysis | Internal Threat Intelligence]

[Indicators | AntiVirus Detection | FileSystem Ops | Registries | Processes | Services | Windows | Exit Tool]

| AntiVirus | Detected | Result | Update | Version |
|---|---|---|---|---|
| Agnitum | true | TrojanSpy.Zbot!OuaqH+sSzk | 20140305 | 5.5.1.3 |
| Jiangmin | true | TrojanSpy.Zbot.fmwu | 20140306 | 16.0.100 |
| Panda | true | Trj/Agent.IVN | 20140306 | 10.0.3.5 |
| GData | true | Trojan.Downloader.Small.ABNB | 20140306 | 24 |
| TrendMicro | true | TROJ_UPATRE.SMA | 20140306 | 9.740-1012 |
| Qihoo-360 | true | Win32/Trojan.Spy.96d | 20140306 | 1.0.0.1015 |
| McAfee | true | Generic.cx | 20140306 | 6.0.4.564 |
| McAfee-GW-Edition | true | Heuristic.LooksLike.Win32.Sus... | 20140306 | 2013 |
| K7GW | true | Trojan.Downloader ( 004457c51... | 20140306 | 9.176.11351 |
| Rising | false | null | 20140306 | 25.0.0.11 |
| Emsisoft | true | Trojan.Downloader.Small.ABNB | 20140306 | 3.0.0.596 |
| ViPRE | true | Trojan.Win32.Cutwail.b a (v) | 20140306 | 27128 |
| Microsoft | true | Trojan.Downloader.Win32/Upat... | 20140306 | 1.10302 |
| AVG | true | Zbot.CWZ | 20140305 | 13.0.0.3169 |
| TheHacker | false | null | 20140305 | null |
| Sophos | true | Troj/Agent-AEIE | 20140306 | 4.98.0 |
| Kaspersky | true | Trojan-Spy.Win32.Zbot.qivh | 20140306 | 12.0.0.1225 |
| NANO-Antivirus | true | Trojan.Win32.Cutwail.b a (v) | 20140306 | 0.28.0.58101 |
| TrendMicro_HouseCall | true | TROJ_UPATRE.SMA | 20140306 | 9.700-1001 |
| DrWeb | true | Trojan.DownLoad3.28161 | 20140306 | 7.00.7.12100 |
| CAT-QuickHeal | true | TrojanDownloader.Upatre.A6 | 20140306 | 12.00 |
| Kingsoft | true | Win32/Troj.Undef.(kloud) | 20140306 | 2013.04.09.267 |
| TotalDefense | true | Win32/Zbot.HMQ | 20140306 | 37.0.10802 |
| F-Prot | true | W32/Trojan3.GGX | 20140306 | 4.7.1.166 |
| Malwarebytes | true | Trojan.Zbot | 20140306 | 1.75.0001 |
| nProtect | true | Trojan-Spy/W32.ZBOT.29696.J | 20140306 | 2014-03-06.01 |
| AntiVir | true | TR/Rogue.AI.10211 | 20140306 | 7.11.135.34 |
| Symantec | true | Trojan.Zbot | 20140306 | 20131.1.5.61 |
| ESET-NOD32 | true | Win32/Trojan.Downloader.Smal... | 20140306 | 9507 |

| Host | Address | Port | Protocol | Request | Accept | Accept-En... | Content-En... | Connection | Content-Ty... | Content-E | User-Agent |
|---|---|---|---|---|---|---|---|---|---|---|---|
| www1.geo... | 199.16.199.2 | 8080 | tcp | POST/pon... | */* | identity,...;q=0 | 226 | close | application/... | binary | Mozilla/4.0... |
| metamorae... | 199.16.199.5 | 80 | tcp | GET/8LhM... | */* | identity,...;q=0 | | close | | | Mozilla/4.0... |
| 91.121.1.54 | 91.121.1.54 | 8080 | tcp | POST/pon... | */* | identity,...;q=0 | 226 | close | application/... | binary | Mozilla/4.0... |
| geoborders... | geoborders... | 8080 | tcp | POST/pon... | */* | identity,...;q=0 | 226 | close | application/... | binary | Mozilla/4.0... |
| gulf-coast-r... | gulf-coast-r... | 80 | tcp | GET/Csad... | */* | identity,...;q=0 | | close | | | Mozilla/4.0... |
| haddadhg... | haddadhg... | 80 | tcp | GET/dfWo... | */* | identity,...;q=0 | | close | | | Mozilla/4.0... |
| metamorae... | metamorae... | 80 | tcp | GET/8LhM... | */* | identity,...;q=0 | | close | | | Mozilla/4.0... |
| sms.thelion... | sms.thelion... | 8080 | tcp | POST/pon... | */* | identity,...;q=0 | 226 | close | application/... | binary | Mozilla/4.0... |
| www1.geo... | www1.geo... | 8080 | tcp | POST/pon... | */* | identity,...;q=0 | 226 | close | application/... | binary | Mozilla/4.0... |
| 13.carnovir... | 13.carnovir... | 80 | tcp | POST/pon... | */* | identity,...;q=0 | 226 | close | application/... | binary | Mozilla/4.0... |
| 13.JONEM... | 13.jonem... | 80 | tcp | POST/pon... | */* | identity,...;q=0 | 226 | close | application/... | binary | Mozilla/4.0... |
| 13.LOMER... | 13.lomerda... | 80 | tcp | POST/pon... | */* | identity,...;q=0 | 226 | close | application/... | binary | Mozilla/4.0... |
| 13.ZABAK... | 13.zabakaf... | 80 | tcp | POST/pon... | */* | identity,...;q=0 | 226 | close | application/... | binary | Mozilla/4.0... |
| 13.carnovir... | 199.16.199.2 | 80 | tcp | GET/F6Gi5... | */* | identity,...;q=0 | | close | | | Mozilla/4.0... |
| www.casar... | 199.16.199.6 | 80 | tcp | GET/F6Gi5... | */* | identity,...;q=0 | | close | | | Mozilla/4.0... |
| www.casar... | www.casar... | 80 | tcp | GET/C55U... | */* | identity,...;q=0 | | close | | | Mozilla/4.0... |
| www.lionsp... | www.lionsp... | 80 | tcp | GETs1B4... | */* | identity,...;q=0 | | close | | | Mozilla/4.0... |
| www.spec3... | www.spec5... | 8080 | tcp | POST/pon... | */* | identity,...;q=0 | 223 | close | application/... | binary | Mozilla/4.0... |
| forum-voip... | 199.16.199.2 | 80 | tcp | GET/8jmLc... | */* | identity,...;q=0 | | close | | | Mozilla/4.0... |
| elitarnie.ho... | 199.16.199.6 | 80 | tcp | GET/FBbp... | */* | identity,...;q=0 | | close | | | Mozilla/4.0... |
| buffalotea.c... | buffalotea.c... | 80 | tcp | GET/8jmLc... | */* | identity,...;q=0 | | close | | | Mozilla/4.0... |
| elitarnie.ho... | elitarnie.ho... | 8080 | tcp | POST/pon... | */* | identity,...;q=0 | 223 | close | application/... | binary | Mozilla/4.0... |
| forum-voip... | forum-voip... | 8080 | tcp | POST/pon... | */* | identity,...;q=0 | 223 | close | application/... | binary | Mozilla/4.0... |
| paralysiesf... | paralysiesf... | 8080 | tcp | POST/pon... | */* | identity,...;q=0 | 223 | close | application/... | binary | Mozilla/4.0... |
| paralysiesf... | paralysiesf... | 8080 | tcp | POST/pon... | */* | identity,...;q=0 | 223 | close | application/... | binary | Mozilla/4.0... |
| shop.smsm... | shop.smsm... | 8080 | tcp | POST/pon... | */* | identity,...;q=0 | 223 | close | application/... | binary | Mozilla/4.0... |
| xmk.karaok... | xmk.karaok... | 80 | tcp | GET/PRJ4t... | */* | identity,...;q=0 | | close | | | Mozilla/4.0... |

FIG. 2G

MALWARE DATA ITEM ANALYSIS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 14/473,860, filed Aug. 29, 2014, titled "MALWARE DATA ITEM ANALYSIS," which application claims benefit of U.S. Provisional Patent Application No. 62/020,905, filed Jul. 3, 2014, titled "MALWARE DATA ITEM ANALYSIS." The entire disclosure of each of the above items is hereby made part of this specification as if set forth fully herein and incorporated by reference for all purposes, for all that it contains.

BACKGROUND

Embodiments of the present disclosure generally related to automatic analysis of data items, and specifically to automatic analysis of malware-related data items.

Malware may include any software program (and/or group of software programs) installed on a computer system and/or a network of computer systems maliciously and/or without authorization. When executed, an item of malware may take any number of undesirable actions including, for example, collection of private or sensitive information (for example, personal data and information, passwords and usernames, and the like), transmission of the collected information to another computing device, destruction or modification of data (for example, accessing, modifying, and/or deleting files), communication with other malware, transmission or replication of malware onto other connected computing devices or systems, transmission of data so as to attack another computing device or system (for example, a Distributed Denial of Service Attack), and/or hijacking of processing power, just to name a few.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to a data analysis system (also referred to herein as "the system") that may automatically analyze a suspected malware file, or group of files. Automatic analysis of the suspected malware file(s) (also referred to herein as file data item(s)) may include one or more automatic analysis techniques. Automatic analysis of a file data item may include production and gathering of various items of information (also referred to herein as "analysis information data items" and/or "analysis information items") related to the file data item including, for example, calculated hashes, file properties, academic analysis information, file execution information, third-party analysis information, and/or the like. The analysis information items may be automatically associated with the file data item, and a user interface may be generated in which the various analysis information items are presented to a human analyst such that the analyst may quickly and efficiently evaluate the file data item. For example, the analyst may quickly determine one or more characteristics of the file data item, whether or not the file data item is malware, and/or a threat level of the file data item.

In various embodiments, the system may receive suspected malware files from various users. The system may automatically analyze submitted file data items, associate the file data items with analysis information items, and/or store the file data item and analysis information items in one or more data stores. The system may generate a submission data item with each submission of a file data item, which submission data item may be associated with the submitted file data item. The system may automatically determine whether or not a particular submitted data item was previously submitted to the system and, if so, may associate a new submission data item with the previously submitted file data item. Further, in an embodiment, the system may not re-analyze a previously submitted file data item. Accordingly, in various embodiments, the system may associate a file data item with various submission data items such that information regarding, for example, a number of submissions and/or time of submission may be presented to the analyst. Additionally, information regarding users who submitted the suspected malware files may be associated with the submission file data items, and may be presented to the analyst in connection with the respective file data items.

In various embodiments, file data items and related information may be shared by the system with one or more third-party systems, and/or third-party systems may share file data items and related information with the system.

As described, some embodiments of the present disclosure related to a system designed to provide interactive, graphical user interfaces (also referred to herein as "user interfaces") for enabling an analyst to quickly and efficiently analyze and evaluate suspected malware data files. The user interfaces are interactive such that a user may make selections, provide inputs, and/or manipulate outputs. In response to various user inputs, the system automatically analyzes suspected malware data files, associates related malware data files, and provides outputs to the user include user interfaces and various analysis information related to the analyzed malware data files. The outputs, including various user interfaces, may be automatically updated based on additional inputs provided by the user.

This application is related to the following U.S. Patent Applications:

| Ser. No. | Title | Filed |
| --- | --- | --- |
| 14/473,920 | EXTERNAL MALWARE DATA ITEM CLUSTERING AND ANALYSIS | Aug. 29, 2014 |
| 14/280,490 | SECURITY SHARING SYSTEM | May 16, 2014 |

The entire disclosure of each of the above items is hereby made part of this specification as if set forth fully herein and incorporated by reference for all purposes, for all that it contains.

According to an embodiment, a computer system comprises: one or more computer readable storage devices configured to store: a plurality of computer executable instructions; and a plurality of file data items and submission data items, each submission data item associated with at least one file data item; and one or more hardware computer processors in communication with the one or more computer readable storage devices and configured to execute the plurality of computer executable instructions in order to cause the computer system to automatically: in response to receiving a new file data item: determine whether the received new file data item was previously received by comparing the received new file data item to the plurality of file data items; and generate a new submission data item; in response to determining that the new file data item was not previously received: initiate an analysis of the new file data item, wherein the analysis of the new file data item generates analysis information items, wherein initiating the analysis of the new file data item comprises: initiating an internal analysis of the new file data item including at least calculation of a hash of the file data item; and initiating an external analysis of the new file data item by one or more third party analysis systems; associate the analysis information items with the new file data item; associate the new submission data item with the new file data item; and generate a user interface including one or more user selectable portions presenting various of the analysis information items.

According to another embodiment, the one or more hardware computer processors are further configured to execute the a plurality of computer executable instructions in order to cause the computer system to: in response to determining that the new file data item was previously received: determine a storage location of the file data item that was previously received; retrieve the analysis information items associated with the file data item that was previously received; associate the new submission data item with the file data item that was previously received; and generate a user interface including one or more user selectable portions presenting various of the analysis information items associated with the file data item that was previously received, the user interface usable by the analyst to determine one or more characteristics of the file data item that was previously received.

According to yet another embodiment, further in response to determining that the new file data item was previously received, the analyst is notified via the user interface that the new file data item was previously received.

According to another embodiment, determining whether the received new file data item was previously received comprises: calculating a hash of the received new file data item and comparing the calculated hash to previously calculated hashes associated with the plurality of file data items.

According to yet another embodiment, the one or more hardware computer processors are further configured to execute the plurality of computer executable instructions in order to cause the computer system to: in response to an analyst input selecting to view a graph of the new file data item, generating a graph including at least a first node representing the new file data item, a second node representing the new submission data item, and an edge connecting the first and second nodes and representing the association between the new file data item and the new submission data item.

According to another embodiment, the graph further includes additional nodes representing other file data items and/or submission data items associated with the new file data item, and additional edges connecting the additional nodes and the first node and representing associations between the other file data items and/or submission data items and the new file data item.

According to yet another embodiment, the internal analysis includes analysis performed by the one or more hardware computer processors, and wherein the internal analysis further includes at least one of calculation of an MD5 hash of the new file data item, calculation of a SHA-1 hash of the new file data item, calculation of a SHA-256 hash of the new file data item, calculation of an SSDeep hash of the new file data item, or calculation of a size of the new file data item.

According to another embodiment, the external analysis includes analysis performed by at least a second computer system, and wherein the external analysis includes execution of the new file data item in a sandboxed environment and analysis of the new file data item by a third-party malware analysis service.

According to yet another embodiment, any payload provided by the new file data item after execution of the new file data item in the sandboxed environment is associated with the new file data item.

According to another embodiment, the one or more hardware computer processors are further configured to execute the plurality of computer executable instructions in order to cause the computer system to: in response to an analyst input, sharing the new file data item and associated analysis information items with a second computer systems via a third computer system.

According to yet another embodiment, a computer-implemented method comprises: storing on one or more computer readable storage devices: a plurality of computer executable instructions; and a plurality of file data items and submission data items, each submission data item associated with at least one file data item; in response to receiving a new file data item: determining, by one or more hardware computer devices configured with specific computer executable instructions, whether the received new file data item was previously received by comparing the received new file data item to the plurality of file data items; and generating, by the one or more hardware computer devices, a new submission data item; and in response to determining that the new file data item was not previously received: initiating, by the one or more hardware computer devices, an analysis of the new file data item, wherein the analysis of the new file data item generates analysis information items, wherein the initiating analysis of the new file data item comprises initiating an internal analysis of the new file data item including at least calculation of a hash of the file data item; associating, by the one or more hardware computer devices, the analysis information items with the new file data item; associating, by the one or more hardware computer devices, the new submission data item with the new file data item; and generating, by the one or more hardware computer devices, a user interface including one or more user selectable portions presenting various of the analysis information items, the user interface usable by an analyst to determine one or more characteristics of the new file data item.

According to another embodiment, the method further comprises: in response to determining that the new file data item was previously received: determining, by the one or more hardware computer devices, a storage location of the file data item that was previously received; retrieving, by the one or more hardware computer devices, the analysis information items associated with the file data item that was previously received; associating, by the one or more hardware computer devices, the new submission data item with the file data item that was previously received; and generating, by the one or more hardware computer devices, a user interface including one or more user selectable portions presenting various of the analysis information items associated with the file data item that was previously received.

According to yet another embodiment, further in response to determining that the new file data item was previously received, the analyst is notified via the user interface that the new file data item was previously received.

According to another embodiment, the internal analysis includes analysis performed by the one or more hardware computer processors, and wherein the internal analysis further includes at least one of calculation of an MD5 hash of the new file data item, calculation of a SHA-1 hash of the new file data item, calculation of a SHA-256 hash of the new file data item, calculation of an SSDeep hash of the new file data item, or calculation of a size of the new file data item.

According to yet another embodiment, the external analysis includes analysis performed by at least a second computer system, and wherein the external analysis includes execution of the new file data item in a sandboxed environment and analysis of the new file data item by a third-party malware analysis service.

According to another embodiment, a non-transitory computer-readable storage medium is disclosed, the non-transitory computer-readable storage medium storing software instructions that, in response to execution by a computer system having one or more hardware processors, configure the computer system to perform operations comprising: storing on one or more computer readable storage devices: a plurality of computer executable instructions; and a plurality of file data items and submission data items, each submission data item associated with at least one file data item; in response to receiving a new file data item: determining whether the received new file data item was previously received by comparing the received new file data item to the plurality of file data items; and generating a new submission data item; and in response to determining that the new file data item was not previously received: initiating an analysis of the new file data item, wherein the analysis of the new file data item generates analysis information items, wherein the initiating analysis of the new file data item comprises initiating an internal analysis of the new file data item including at least calculation of a hash of the file data item; associating the analysis information items with the new file data item; associating the new submission data item with the new file data item; and generating a user interface including one or more user selectable portions presenting various of the analysis information items, the user interface usable by an analyst to determine one or more characteristics of the new file data item.

According to yet another embodiment, the software instructions further configure the computer system to perform operations comprising: in response to determining that the new file data item was previously received: determining a storage location of the file data item that was previously received; retrieving the analysis information items associated with the file data item that was previously received; associating the new submission data item with the file data item that was previously received; and generating a user interface including one or more user selectable portions presenting various of the analysis information items associated with the file data item that was previously received.

According to another embodiment, further in response to determining that the new file data item was previously received, the analyst is notified via the user interface that the new file data item was previously received.

According to yet another embodiment, the internal analysis includes analysis performed by the one or more hardware computer processors, and wherein the internal analysis further includes at least one of calculation of an MD5 hash of the new file data item, calculation of a SHA-1 hash of the new file data item, or calculation of a size of the new file data item.

According to another embodiment, the initiating analysis of the new file data item further comprises: initiating an external analysis of the new file data item, wherein the external analysis includes execution of the new file data item in a sandboxed environment and analysis of the new file data item by a third-party malware analysis service.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 2A-2H illustrate example user interfaces of the data analysis system, according to embodiments of the present disclosure.

DETAILED DESCRIPTION

Figure 1:
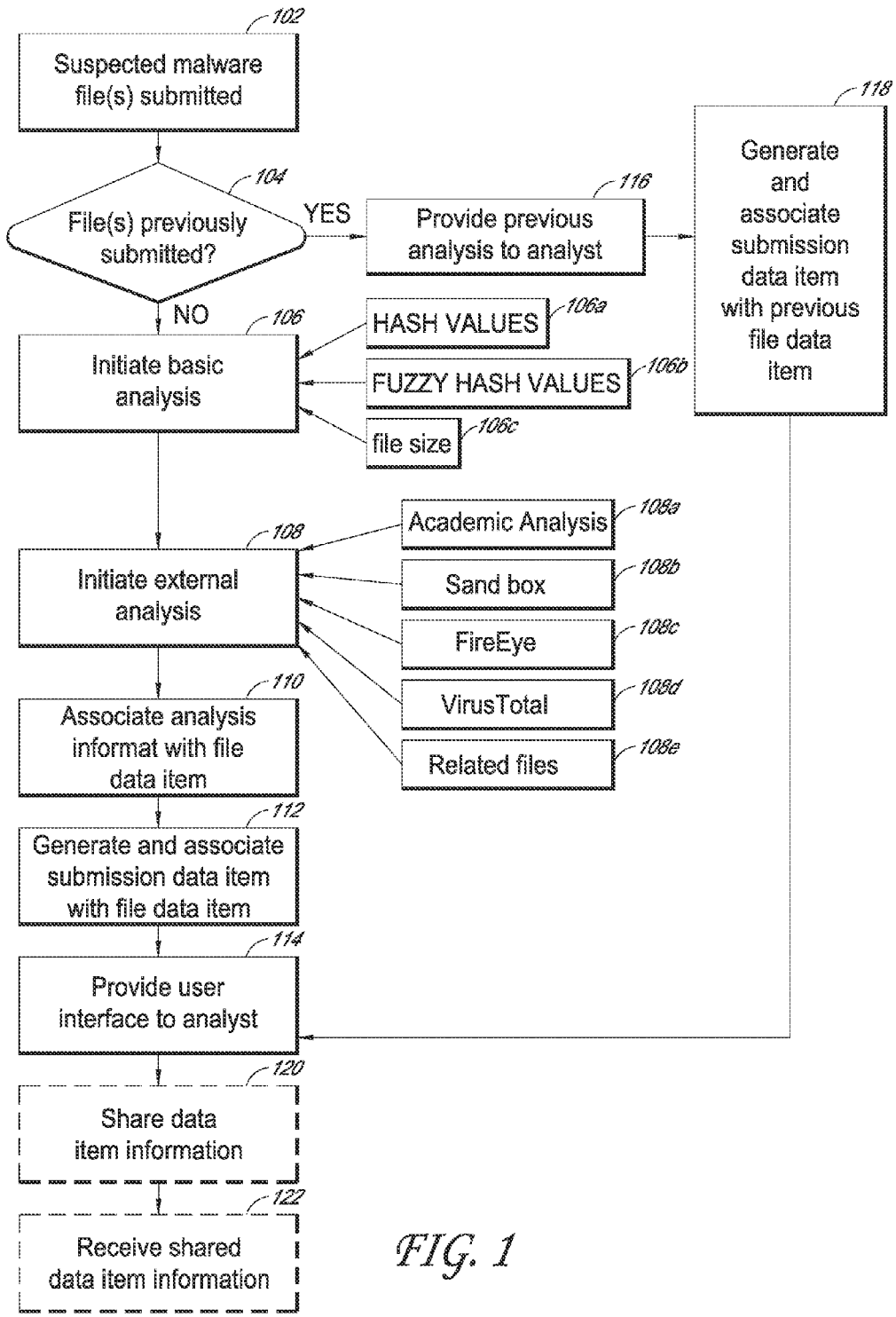
FIG. 1 is a flowchart of an example method of data analysis system, according to an embodiment of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

In order to facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (for example, Oracle database, mySQL database, and the like), spreadsheets, XML files, and text file, among others. The various terms "database," "data store," and "data source" may be used interchangeably in the present disclosure.

Data Item (Item), Data Object (Object), or Data Entity (Entity): A data container for information representing specific things in the world that have a number of definable properties. For example, a data item may represent an item such as a person, a place, an organization, an account, a computer, an activity, a market instrument, or other noun. A data item may represent an event that happens at a point in time or for a duration. A data item may represent a document or other unstructured data source such as an e-mail message, a news report, or a written paper or article. Each data item may be associated with a unique identifier that uniquely identifies the data item. The data item's attributes (for example, metadata about the data item) may be represented in one or more properties. The terms "data item," "data object," "data entity," "item," "object," and "entity" may be used interchangeably and/or synonymously in the present disclosure.

Item (or Entity or Object) Type: Type of a data item (for example, Person, Event, or Document). Data item types may be defined by an ontology and may be modified or updated to include additional data item types. An data item definition (for example, in an ontology) may include how the data item is related to other data items, such as being a sub-data item type of another data item type (for example, an agent may be a sub-data item of a person data item type), and the properties the data item type may have.

Properties: Also referred to as "metadata," includes attributes of a data item that represent individual data items. At a minimum, each property of a data item has a property type and a value or values. Properties/metadata associated with data items may include any information relevant to that object. For example, properties associated with a person data item may include a name (for example, John Doe), an address (for example, 123 S. Orange Street), and/or a phone number (for example, 800-0000), among other properties. In another example, metadata associated with a computer data item may include a list of users (for example, user1, user 2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Overview

Embodiments of the present disclosure relate to a data analysis system (also referred to herein as "the system") that may automatically analyze a suspected malware file, or group of files, and present analysis information to an analyst via a user interface. Malware files may include any software program file (and/or group of software program file) that may be installed on a computer system and/or a network of computer systems maliciously and/or without authorization. When executed, a malware file may take any number of undesirable actions including, for example, collection of private or sensitive information (for example, personal data and information, passwords and usernames, and the like), transmission of the collected information to another computing device, destruction or modification of data (for example, accessing, modifying, and/or deleting files), communication with other malware, transmission or replication of malware onto other connected computing devices or systems, transmission of data so as to attack another computing device or system (for example, a Distributed Denial of Service Attack), and/or hijacking of processing power, just to name a few. In most cases such malware infects a computing device via a network connection (for example, a connection to the Internet), and communicates with another computing device or system (for example, another Internet-connected computing device) to accomplish its purpose. Oftentimes malware is well hidden in the infected computing device such that it may not be detectable to an average user of the computing device.

Detection and removal of malware from infected computing devices and/or systems is a highly desirable, but oftentimes challenging task. Detection of malware is of particular importance to organizations (for example, businesses) that maintain internal networks of computing devices that may be connected to various external networks of computing devices (for example, the Internet) because infection of a single computing device of the internal network may quickly spread to other computing devices of the internal network and may result in significant data loss and/or financial consequences.

Detection of malware may be enabled by accurate and thorough information regarding the malware. Further, whether or not a particular file or program is an item of malware, and an accurate assessment of threat posed by the item of malware, may be enabled by such accurate and thorough information. Previously, determination and collection of information about a suspected malware file was a labor intensive task. For example, an analyst may have had to isolate the suspected malware file, manually run tests and analyses on the suspected malware file, and compile any information gleaned from such tests and analyses. The compiled information may be in varying formats and difficult to analyze. Further, a given suspected malware file may be analyzed multiple times in such a manual process, unbeknownst to the analyst (because, for example, the suspected malware file may have been found in multiple disjoint incidents).

Embodiments of the data analysis system described herein may overcome the limitations and deficiencies of previous methods of gathering information about suspected malware files. For example, an analyst may simply provide a suspected malware file, or group of files, to the data analysis system for automatic analysis and generation of a user interface by which the analyst may efficiently evaluate the analysis and the suspected malware file. In various embodiments, the system, by way of automatic analysis of file data items, may generate accurate and thorough information regarding the file data items. Automatic analysis of the suspected malware file(s) (also referred to herein as file data item(s)) may include one or more automatic analysis techniques, including, for example, determination of various properties of the file data item, execution of the file data item in a sandbox environment to determine payloads (e.g., files exposed and/or created by execution of the malware, which may be referred to as "payloads," "drop files," and/or "dropped file data items") and behaviors, and/or submission of the file data item to one or more third-party analysis providers, just to name a few. Automatic analysis of a file data item may include production and gathering of various items of information (also referred to herein as "analysis information data items" and/or "analysis information items") related to the file data item including, for example, calculated hashes, file properties, academic analysis information, file execution information, third-party analysis information, and/or the like. The analysis information items may be automatically associated with the file data item by the system, and a user interface may be generated in which the various analysis information items are presented to the analyst such that a human analyst may quickly and efficiently evaluate the file data item. For example, the analyst may quickly determine one or more characteristics of the file data item, whether or not the file data item is malware, and/or a threat level of the file data item.

In various embodiments, the system may receive suspected malware files from various users. The system may automatically analyze submitted file data items, associate the file data items with analysis information items, and store the file data item and analysis information items in one or more data stores. The system may generate a submission data item with each submission of a file data item, which submission data item may be associated with the submitted file data item. The system may automatically determine whether or not a particular submitted data item was previously submitted to the system and, if so, may associate a new submission data item with the previously submitted file data item. Further, in an embodiment, the system may not re-analyze a previously submitted file data item. Accordingly, in various embodiments, the system may associate a file data item with various submission data items such that information regarding, for example, a number of submissions and/or time of submission may be presented to the analyst. Additionally, information regarding users who submitted the suspected malware files may be associated with the submission file data items, and may be presented to the analyst in connection with the respective file data items.

In various embodiments, file data items and related information may be shared by the system with one or more third-party systems, and/or third-party systems may share file data items and related information with the system.

In various embodiments, file data items may be submitted and evaluated by a single person (for example, the user submitting the file data item, and the analyst evaluating the results of the system's analysis, may be the same person), or may be submitted by a first person and evaluated by a second person.

In various embodiments, the data analysis system as described herein may be used in conjunction with additional systems and/or components to enable automatic clustering of various data items related to an analyzed file data item. Examples of such clustering, and further analysis of data clusters and generation of associated user interfaces are described in U.S. patent application Ser. No. 14/473,920, titled "EXTERNAL MALWARE DATA ITEM CLUSTERING AND ANALYSIS," previously incorporated by reference herein. Accordingly, in various embodiments, the data analysis system may enable automatic, efficient, and effective detection, analysis, and evaluation (by an analyst) of likely malware on computing devices and/or network.

Description of the Figures

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure described above and/or below may include several novel features, no single one of which is solely responsible for its desirable attributes or which is essential to practicing the embodiments of the disclosure herein described.

FIG. 1 is a flowchart of an example method of data analysis system, according to an embodiment of the present disclosure. In various embodiments, fewer blocks or additional blocks may be included in the example method of FIG. 1, or various blocks may be performed in an order different from that shown. The functionality of the data analysis system as described in reference to FIG. 1 may be implemented in one or more computer modules and/or processors, as is described below in reference to FIG. 5. For example, in various embodiments, one or more blocks in the flowchart may be performed by one or more components of the data analysis system, for example, computer system 800 and/or various servers 830, as described below in reference to FIG. 5.

In the embodiment of the flowchart of FIG. 1, at block 102 one or more suspected malware files (also referred to herein as "file data items") are received by the system. The file data items may be submitted to the system, for example, by a user and via a user interface of the system. FIG. 2A illustrates an example user interface 202 of the system by which a user may submit a file data item, according to an embodiment. In the example user interface 202, the user may provide information regarding the submission via fields 204. For example, the user may select the suspect malware file (or files) to submit, may indicate a case name (for example, the user may associate the submission with a particular investigation or case file by providing a case name), may provide a date associated with the submission (that may be, for example, a date on which the file data items is submitted or, alternatively, a date when the file data item was obtained), may indicate a team or name to associate with the file data item, and/or may provide a name of the submitter (for example, the user). The information provided by the user may be associated with the submitted file data item such that the file data item may be associated with other related file data items by the system (for example, other file data items of the same "case," submitted by the same "team", submitted within an organization, etc.). Further, the information provided by the user may be included in a further user interface of the system as described below.

The user interface 202 further includes a submit button (or other user interface element) 206 that the user may select to submit the file data item and initiate an automatic analysis of the file data item, as described below. An "add to graph" button may also be provided that, when selected, may cause the system to, before or after analysis, add the file data item to a graph and/or view the file data item and other related data items in a graph or other visualization, similar to the description below in reference to FIGS. 2H and 4, and as described in U.S. patent application Ser. No. 14/473,920, titled "EXTERNAL MALWARE DATA ITEM CLUSTERING AND ANALYSIS."

In other embodiments, file data items may be automatically received by, or submitted to, the system based on one or more factors, such as when a file data item is stored, accessed, and/or updated on a storage device of the system.

Returning to the flowchart of FIG. 1, when a file data item is received by the system, at block 104 the system determines whether or not the file data item was previously received. Determination of whether a file data item was previously received by the system may enable more efficient operation of the system. For example, as described below, a previously received file may not be re-analyzed, but a previous analysis may be retrieved by the system and presented to the analyst. The system may determine whether a file data item was previously submitted to the system in any of a variety of ways, and/or by any combination of the variety of ways. For example, the system may compute and compare hashes (by, for example, any known hash function) of submitted file data items, may compare file names of submitted file data items, may compare file sizes of submitted file data items, and/or the like. As mentioned, in various embodiments the system may base a determination of whether or not a file data item was previously received on multiple equally or unequally weighted factors.

If the system determines that the file data item was previously received, at block 116 the system provides a previously determined analysis to the analyst and notifies the analyst that the file data item was previously received (via, for example, a popup window). For example, the system may retrieve a previous analysis of the previously submitted file data item from a data store of the system, and as shown at block 114 (and as described below), provide a user interface to the analyst with the previous analysis information. At block 118, a new submission data item associated with the current submission is generated by the system and associated with the previously submitted file data item. The submission data item may include, for example, the various information provided in the user interface of FIG. 2A. Generation and association of submission data items in connection with each submission by a user enables the system to determine all instances of particular file data items being submitted to the system, associate those instances with the file data item, and present that information to the analyst, as described below.

If the system determines that the file data item was not previously received, the system proceeds with an automatic analysis of the file data item.

At block 106 the system initiates a basic analysis of the received file data item. The basic analysis (also referred to herein as an "internal analysis") is generally performed by the system and may include various analyses of the received file data item. Examples of the various analyses performed on the received file data item include, for example, calculation of hash values 106a (for example, calculation of MD5, SHA-1, SHA256, and/or the like) of the file data item, calculation of fuzzy hash values 106b (for example, calculation of SSDeep and/or the like) of the file data item, calculation of other hashes of the file data item, determination of a file size of the file data item (as shown at block 106c), determination of a file type of the file data item, determination of a file name of the file data item, and/or the like. Any information provided by the basic analysis processes may be referred to herein as basic analysis information items, and such basic analysis information items are associated with the file data item analyzed. In various embodiments, as described below, the basic analysis information may be provided to one or more external analysis services to enable more efficient analysis of the file data item. Further, the basic analysis information may be used by the analyst to evaluate the file data item. For example, the analyst may determine, based on the file size of the file data item, that the file data item is less likely to be a malware file.

In an embodiment, when a file data item received by the system is compressed and/or encrypted (for example, contained in a "zip"-type file), the system may automatically un-compress and/or un-encrypt the file data item prior to the basic analysis (such that, for example, the actual file data item of interest may be analyzed, and not a compressed version of the file data item). For example, when necessary the system may request an encryption key from the user upon determination that the file data item is encrypted and/or when the file data item is submitted (for example, via the user interface 202). In an embodiment, the system may automatically determine that a submitted file data item is compressed and/or encrypted. Similarly, the system may automatically un-compress and/or un-encrypt the file data item prior to the external analysis described below. In an embodiment, the file data item may be kept uncompressed and/or unencrypted during both basic analysis and external analysis, and/or during any further analysis. Alternatively, the file data item may be re-compressed and/or re-encrypted (by the same or different algorithms as were used in the initial compression and/or encryption) between the basic analysis and the external analysis such that the file data item may be, for example, safely transmitted to an external service (as described below). In an embodiment, after analyzing the file data item, the system may automatically re-compress and/or re-encrypt (by the same or different algorithms as were used in the initial compression and/or encryption) the file data item prior to storing the file data item.

FIG. 2B illustrates an example user interface of the system in which an analysis of a file data item is presented, including basic analysis information, according to an embodiment. Such a user interface may be provided, for example, at block 114 of FIG. 1. The user interface of FIG. 2B includes various basic analysis information in boxes 212 and 214. The user interface of FIG. 2B also includes a portion 216 showing various external analysis information, described below. Further, the user interface of FIG. 2B includes various user interface elements (for example, selectable buttons 218) by which an analyst may perform various actions, described below.

Returning to the flowchart of FIG. 1, at block 108 the system initiates an external analysis of the received file data item. The external analysis is generally performed by one or more computing devices external to the system, however in some embodiments aspects (or all aspects) of the external analysis may be performed by the system. The external analysis of the file data item may include, for example, academic analysis (as shown at block 108a), execution of the file data item in a sandbox environment (as shown at block 108b), analysis of the file data item by one or more third-party analysis providers (for example, FireEye, Inc. (block 108c); VirusTotal (block 108d), a service provided by Google; and/or the like), aggregation of file data items (and/or other data items) related to the submitted file data item, and/or the like. Any information determined and/or obtained via one or more external analysis processes may be referred to herein as external analysis information items, and such external analysis information items are associated with the file data item analyzed. In an embodiment, the system may automatically provide one or more basic analysis data items to the external analysis providers to enable a more efficient external analysis. For example, the system may provide a hash of the file data item, an encryption key of the file data item (in the example of the file data item being encrypted and/or compressed), and/or the like such that the external analysis provider may quickly identify the file data item, un-compress and/or un-encrypt the file data item, determine whether the file data item was previously analyzed, and/or the like.

As mentioned above, external analysis may include academic analysis 108a. Academic analysis may include, for example, transmission and/or submission of the file data item to an academic team and/or academic system for analysis, such as a graduate program at a university with a focus on improved malware detection techniques. The academic analysis may include one or more cutting edge analysis techniques, the results of which may be transmitted back to the data analysis system for association with the file data item. The results of the academic analysis may then be presented in a user interface of the system such as the user interface of FIG. 2B.

As also mentioned above, external analysis may include execution of the file data item in a sandbox environment 108b. A sandbox environment may be a secure computing environment specially designed for execution and analysis of an item of malware. The sandbox is generally walled off from any other computing system so as to prevent damage or infection of any other computing systems by malware when the malware is executed. For example, a sandbox may include a virtual machine executing on a computing system, which has no access to the operating system executing the virtual machine, any data outside of the virtual machine, any networks, etc.

The data analysis system may automatically provide the file data item to such a sandbox environment, which may then execute the file data item. The system may then analyze and record any actions taken or initiated by the file data item upon execution (or such information may be obtained from a sandbox environment external to the system that executes the file data item). For example, the file data item may attempt to contact one or more URLs or domains, may make modifications to files and/or a file system, may make modification to an operating system registry, may deliver one or more payloads (for example, additional files or programs written to the computing system on which the file data item is executed, and/or executed by the file data item on the computing system on which the file data item is executed), and/or the like. The data analysis system may then record such analysis information, including payloads provided by the file data item, and associate them with the file data item. The portion 216 of the user interface of FIG. 2B illustrates example analysis information items gathered and presented in response to a sandbox analysis. In the user interface, the "indicators" selector 220 is selected, such that various indictors associated with the file data item are shown in the portion 216. For example, the portion 216 in FIG. 2B shows network connections made by the file data item, file system changes, and/or registry changes. Other information may also be shown in the portion 216, and/or other sandbox analysis information may be shown in one or more other user interfaces as described below. In some embodiments, drop files (also referred to herein as "payloads," "drop files," and/or "dropped file data items") created by executing the file data item in a sandbox, for example, may be submitted to the system for a same or similar analysis as is discussed in FIG. 1, such as starting with block 104. The analysis information associated with drop files, and/or file data items associated with the drop files, may then be associated with the file data item as described below with various types of data items.

As also mentioned above, external analysis may include transmission and/or submission of the file data item to one or more third-party analysis providers for analysis. Examples of such third-party analysis providers include FireEye (block 108c), and VirusTotal (block 108d). The one or more third-party analysis providers may then transmit one or more analysis information items back to the system, where it may be associated with the file data item and displayed to the analyst.

FIGS. 2D-2G illustrate example user interfaces of the system in which a third-party provider analyses of a file data item are presented, according to an embodiment. Each of FIGS. 2D-2G illustrate information that may be presented in portion 216 of FIG. 2B when, for example, external analysis selector 236 is selected by the analyst (as shown in FIG. 2D). As indicated in FIG. 2D, selection of VirusTotal button 238 may cause the system to display analysis information gathered as a result of an analysis of the file data item by VirusTotal. The analysis information data items returned from this example third party analysis provider include, for example, a submission time, a vendor score (which may indicate, for example, a threat level of the file data item as determined by the third party analysis provider), a name by which the file data item is known among one or more third-party analysis providers and/or other security vendors (for example, "Generic.qx"), and various other information, such as the other various analysis information data items illustrated in display portion 240. In some embodiments, portion 240 may include various selectable buttons, such as Indicators button 241, the selection of which causes the system to display a particular category of analysis information data items, as shown. In an embodiment, in response to receiving particular vendor scores (indicating, for example, threat levels of the file data item) the system may automatically alert the analyst and/or provide different visual indicators (for example, color the user interface or a portion of the user interface with a color corresponding to the threat level). For example, when a vendor score indicates a sufficiently high threat level (as determined, for example, by a comparison to one or more predefined thresholds) the system may automatically alert the analyst via a popup window and/or other notification (for example, an email and/or text message).

FIG. 2E illustrates another user interface of the data analysis system in which the analyst has selected Antivirus Detection button 242 to view antivirus analysis information provided by VirusTotal. FIG. 2F illustrates another user interface of the data analysis system in which the analyst has selected button FireEye 244 to view analysis information provided by example third-party analysis provider, FireEye. As with FIG. 2D, in FIG. 2F various selectable buttons (such as Alerts button 246) may be provided such that the analyst may view various analysis information. FIG. 2G illustrates another user interface of the data analysis system in which the analyst has selected Network Indicators button 248 to view network indicator analysis information provided by FireEye. Network indicators may include various analysis information items, such as those illustrated in the example of FIG. 2G, such as domains, URLs, IP addresses, ports, protocols, etc. associated with execution of the file data item selected one or more third-party analysis provider (FireEye in the example of FIG. 2G). In other embodiments, other third-party analysis providers may be used and, thus, user interfaces may be updated to indicate those particular third-party analysis providers. In some embodiments, multiple third-party analyses may be combined, such as by combining a threat risk score from multiple third-party analysts into a single, easily understood risk level to be provided to the analyst.

As also mentioned above, the external analysis block 108 may include gathering of various data items (for example, other file data items) by the system that may be related to the file data item. Examples of such files may include submission data items (for example, as generated each time the file data item has been submitted to the system, as described above and below), other files submitted to the system by users and designated as related to the file data item, payloads gathered from execution of the file data item in a sandbox environment, and/or the like.

Figure 2C:
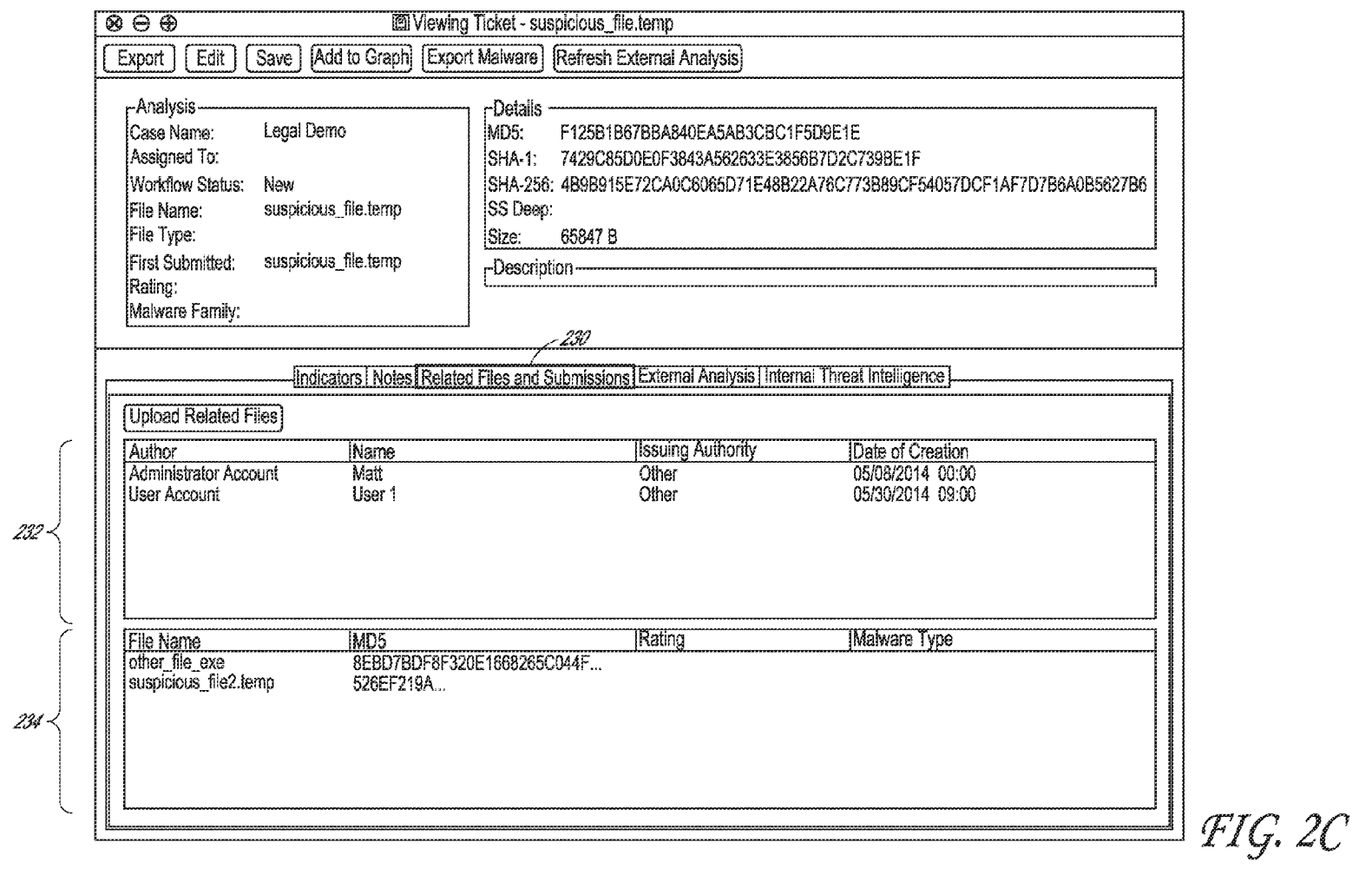
Figure 2F:
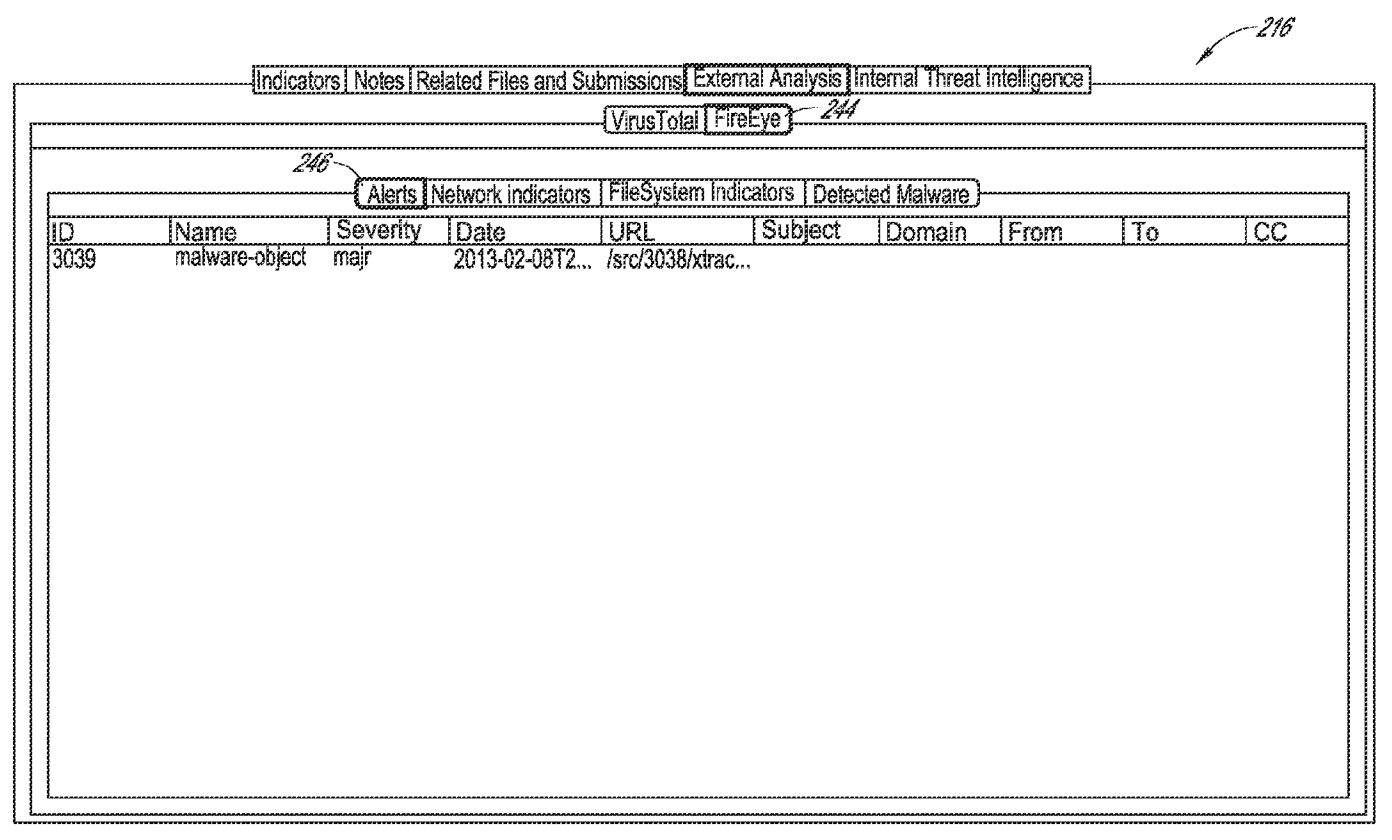

FIG. 2C illustrates an example user interface of the system in which related files are displayed, according to an embodiment. As shown, in response to the analyst's selection of Related Items button 230, various related file information is displayed in user interface portions 232 and 234. Portion 232 may display, for example, a list of submission data items associated with the file data item. Each time the file data item is submitted to the system, as described above and below, a new submission data item is created and associated with the file data item. Information regarding those submission data items may be viewed and accessed in portion 232 of the Related Items tab of the example user interface. Portion 234 may display, for example, a list of other file data items (and/or other data items) associated with the submitted file data item. For example, the portion 234 may list data items gathered by the system when the file data item is executed in a sandbox environment. Additionally, the analyst (and/or other user of the system) may manually submit data items to the system via, for example, the "Upload Related Files" button shown in FIG. 2C. When a file data item is submitted to the system in this way, the system again automatically checks whether the file data item was previously submitted, and if so, it may notify the analyst via, for example, a popup window. Further, the submitted file data item is then listed in the portion 234 as the file data item is associated with the originally submitted file data item. In an embodiment, selection of a data item listed in the portions 232 and/or 234 causes the data analysis system to display a user interface (for example, similar to the user interfaces of FIGS. 2B-2G) with details related to the selected data item. In this embodiment, the portion 234 with respect to each of two related file data items would show, in the list, a link to the other file data item.

Returning to the flowchart of FIG. 1, at block 110 the system associates the various analysis information items, such as from one or more internal analyses (e.g., block 106) and/or one or more external analyses (e.g., block 108) with the file data item. Further, at block 112 the system generates a submission data item (for example, related to the submission of the file data item at block 102) and associates the submission data item with the submitted file data item (similar to the description of block 118 provided above).

At block 114 the user interface (for example, the user interface of FIG. 2C) is provided to the analyst such that the analyst may view the various analysis information items and quickly determine one or more characteristics of the file data item, whether or not the file data item is malware, and/or a threat level of the file data item. As mentioned above, the user interface of FIG. 2B includes various selectable buttons 218 by which an analyst may perform various actions to view and investigate information related to an analyzed file data item. For example, an "export" button may be used to export the gathered analysis information items to another file format and/or to another application; an "edit" button may be used to edit information associated with the file data item; a "save" button may be used to commit any changes to the information to a data store of the system; an "add to graph" button may be used, as described above, to add the file data item and/or any related data items to a graph and/or view the file data item and other related data items in a graph or other visualization, as described in reference to FIG. 2H below; an "export malware" button may be used to retrieve the file data item and/or related analysis information from the system (for example, to transfer the file data item another computing system for further analysis); and/or a "refresh external analysis" button may be used to cause the system to re-run any external analysis on the file data item.

Figure 2H:
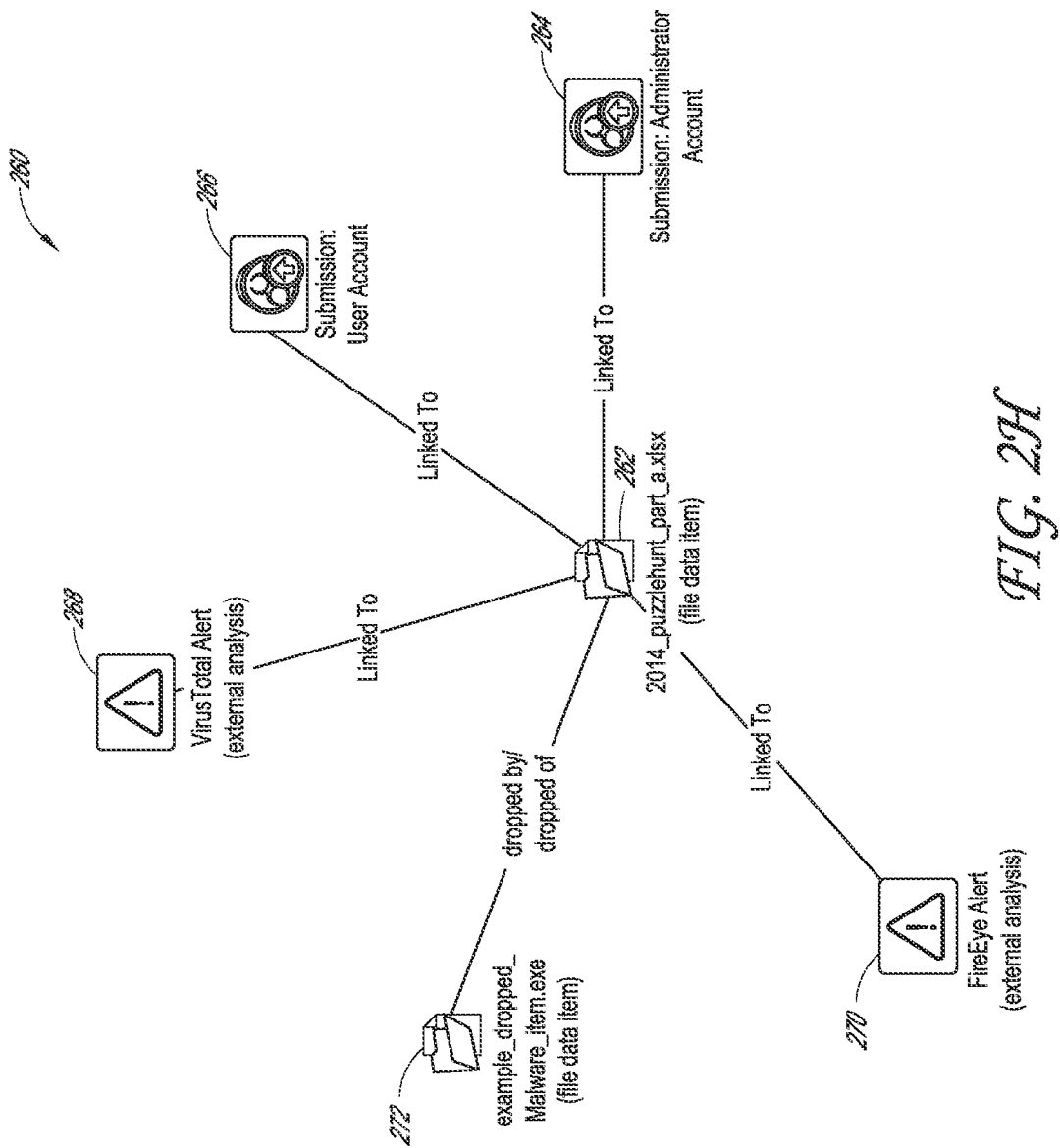

FIG. 2H illustrates an example user interface of the system in which related data items are displayed in a graph 260 (for example, in response to selection of the "add to graph" button of FIG. 2B), according to an embodiment. The graph 260 is structured similarly to graph 1403 described in reference to FIG. 4 below, and accordingly the description of FIG. 4 applies to FIG. 2H, as appropriate. FIG. 2H includes a file data item 262 (for example, a received and analyzed file data item) with links to various related data items. The related data items include a submission data item 264, another submission data item 266 (for example, because the file data item 262 was submitted two times to the system, as indicated and described above in reference to FIG. 2C), a dropped file data item 272 (that was, for example, dropped by the file data item 262 when the file data item 262 was executed in a sandbox), and two data items 268 and 270 representing analysis information items from external analysis of the file data item. Various other data items may be presented in the graph 260 including, for example, related file data items, users associated with submission data items, and/or the like. Accordingly, in various embodiments, a graph user interface such as the graph 260 may enable the analyst to visualize the file data item and associated analysis, and efficiently and quickly determine one or more characteristics of the file data item, whether or not the file data item is malware, and/or a threat level of the file data item. For example, after automatic analysis of the submitted file data item (as described above), the analyst may easily view various analysis information items by viewing one or more of the user interface of FIGS. 2A-2H. The analyst may quickly determine, for example, that the file data item was previously submitted multiple times by multiple users, and thus that the file data item is likely a high risk. The analyst may quickly determine, for example, that the file data item makes multiple modifications to a filesystem and registry, and that the types of modifications are likely malicious. Further, for example, the analyst may, based on various analysis information items, have a hunch that the file data item is malicious, and such a hunch may be confirmed by the various external analysis information items gathered by the system and provided to the analyst. Additionally, for example, the analyst may easily determine that a given file data item is related to one or more other file data items that may, for example, contact similar domains. All of these examples, through use of the automatic analysis provided by the system in various embodiments, may be accomplished without manual analysis by the analyst of the file data item. Thus, according to these various examples and the various embodiments of the disclosure described above, the system may enable the analyst to quickly and efficiently evaluate a file data item for suspected malware.

Returning to the flowchart of FIG. 1, at optional blocks 120 and 121, file data items and/or analysis information items associated with file data items of the data analysis system may be shared with various entities (e.g., computing systems or groups of computing systems) within an organization and/or one or more third-party systems, and/or third-party systems may share file data items and related information with the system (for example, for association with one or more file data items). Similarly, sharing may take place between multiple instantiations of the data analysis system as operated by, for example, multiple organization. Sharing of data may be limited in various ways, such as based on access rules that are determined by the information providing entity or a third-party mediator that facilitates sharing, and may be limited in various ways, such as by recipient, by type of recipient, and/or by a type of data shared. In an embodiment, sharing may be facilitated by a third-party system acting as, for example, a mediator. Such a third-party system may facilitate sharing of data item information among various other systems. Examples of sharing of data that may be used in the data analysis system are described in U.S. patent application Ser. No. 14/280,490, previously incorporated by referenced herein.

In an embodiment, the data analysis system encrypts and/or otherwise secures stored file data items such that they may not be executed by the system when not being analyzed and/or outside of a sandbox environment.

In an embodiment, an analyst may add notes and/or tags to a file data item via a user interface of the system. For example, the analyst may, after reviewing the analysis, make a determination regarding the type of malware and/or threat level of the malware of the file data item, and may add notes and/or tags to that effect to be associated with the file data item. In this embodiment, other analysts may then be able to review the notes and/or tags when accessing the file data item. Additionally, the analyst and/or other analysts may be able to determine any previous times a particular malware file has appeared on a network and details about those instances. In an embodiment, a notification of the previous instances a malware file has been found and/or analyzed may be provided to the analyst. In an embodiment, the analyst may mark the file data item as likely malware (or, for example, "malicious") or not likely malware.

Data Item-Centric Data Model

To provide a framework for the description of specific systems and methods provided above and below, an example database system 1210 using an ontology 1205 will now be described in reference to FIGS. 3A-3B and 4. This description is provided for the purpose of providing an example and is not intended to limit the techniques to the example data model, the example database system, or the example database system's use of an ontology to represent information.

In one embodiment, a body of data is conceptually structured according to data item-centric data model represented by ontology 1205. The conceptual data model is independent of any particular database used for durably storing one or more database(s) 1209 based on the ontology 1205. For example, each object of the conceptual data model may correspond to one or more rows in a relational database or an entry in Lightweight Directory Access Protocol (LDAP) database, or any combination of one or more databases.

Figure 3A:
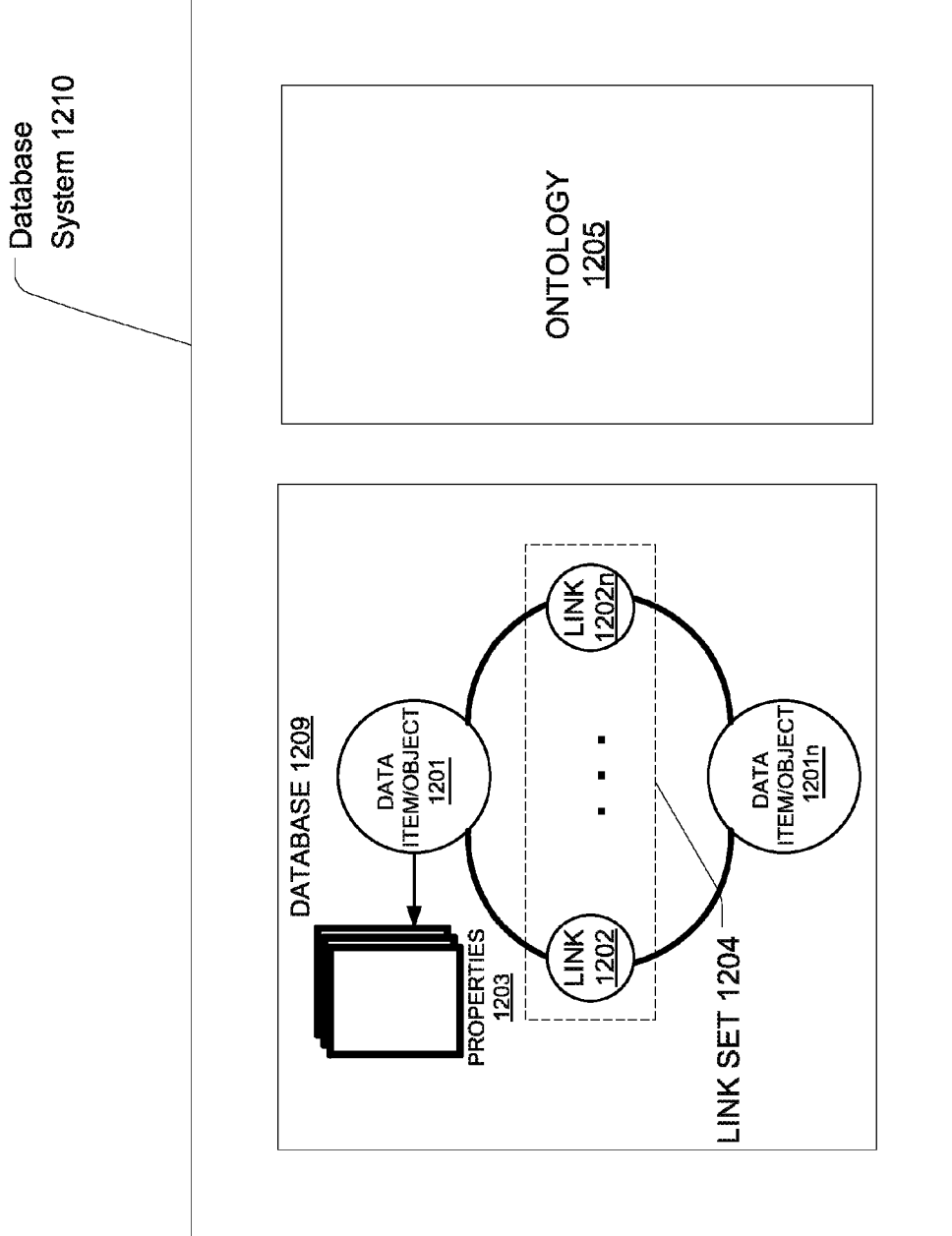
FIG. 3A illustrates an embodiment of a database system using an ontology.

FIG. 3A illustrates data item-centric conceptual data model (which may also be referred to as an "object-centric conceptual data model") according to an embodiment. An ontology 1205, as noted above, may include stored information providing a data model for storage of data in the database 1209. The ontology 1205 may be defined by one or more data item types (which may also be referred to as "object types"), which may each be associated with one or more property types. At the highest level of abstraction, data item 1201 (which may also be referred to as a "data object" or "object") is a container for information representing things in the world. For example, data item 1201 can represent an entity such as a person, a place, an organization, a market instrument, or other noun. Data item 1201 can represent an event that happens at a point in time or for a duration. Data item 1201 can represent a document or other unstructured data source such as a file (for example, a malware file), an email message, a news report, or a written paper or article. Each data item 1201 is associated with a unique identifier that uniquely identifies the data item within the database system.

Different types of data items may have different property types. For example, a "file" data item (as described above) may have various property types as described above (for example, various hash property types, associated file property types, various external analysis property types, and/or the like), a "Person" data item may have an "Eye Color" property type, and an "Event" data item may have a "Date" property type. Each property 1203 as represented by data in the database system 1210 may have a property type defined by the ontology 1205 used by the database 1205. Properties of data items may, in an embodiment, themselves be data items and/or associated with data items. For example, file data items may be associated with various analysis information items, as described above. Analysis information items may comprise data items and/or properties associated with data items (for example, file data items).

Items may be instantiated in the database 1209 in accordance with the corresponding data item definition for the particular data item in the ontology 1205. For example, a specific monetary payment (e.g., an item of type "event") of US$30.00 (e.g., a property of type "currency") taking place on Mar. 27, 2009 (e.g., a property of type "date") may be stored in the database 1209 as an event data item with associated currency and date properties as defined within the ontology 1205.

The data objects defined in the ontology 1205 may support property multiplicity. In particular, a data item 1201 may be allowed to have more than one property 1203 of the same property type. For example, a "Person" data item may have multiple "Address" properties or multiple "Name" properties.

Each link 1202 represents a connection between two data items 1201. In one embodiment, the connection is either through a relationship, an event, or through matching properties. A relationship connection may be asymmetrical or symmetrical. For example, "Person" data item A may be connected to "Person" data item B by a "Child Of" relationship (where "Person" data item B has an asymmetric "Parent Of" relationship to "Person" data item A), a "Kin Of" symmetric relationship to "Person" data item C, and an asymmetric "Member Of" relationship to "Organization" data item X. The type of relationship between two data items may vary depending on the types of the data items. For example, "Person" data item A may have an "Appears In" relationship with "Document" data item Y or have a "Participate In" relationship with "Event" data item E. As an example of an event connection, two "Person" data items may be connected by an "Airline Flight" data item representing a particular airline flight if they traveled together on that flight, or by a "Meeting" data item representing a particular meeting if they both attended that meeting. In one embodiment, when two data items are connected by an event, they are also connected by relationships, in which each data item has a specific relationship to the event, such as, for example, an "Appears In" relationship.

As an example of a matching properties connection, two "Person" data items representing a brother and a sister, may both have an "Address" property that indicates where they live. If the brother and the sister live in the same home, then their "Address" properties likely contain similar, if not identical property values. In one embodiment, a link between two data items may be established based on similar or matching properties (e.g., property types and/or property values) of the data items. These are just some examples of the types of connections that may be represented by a link and other types of connections may be represented; embodiments are not limited to any particular types of connections between data items. For example, a document might contain references to two different items. For example, a document may contain a reference to a payment (one item), and a person (a second item). A link between these two items may represent a connection between these two entities through their co-occurrence within the same document.

Each data item 1201 may have multiple links with another data item 1201 to form a link set 1204. For example, two "Person" data items representing a husband and a wife could be linked through a "Spouse Of" relationship, a matching "Address" property, and one or more matching "Event" properties (e.g., a wedding). Each link 1202 as represented by data in a database may have a link type defined by the database ontology used by the database.

Figure 3B:
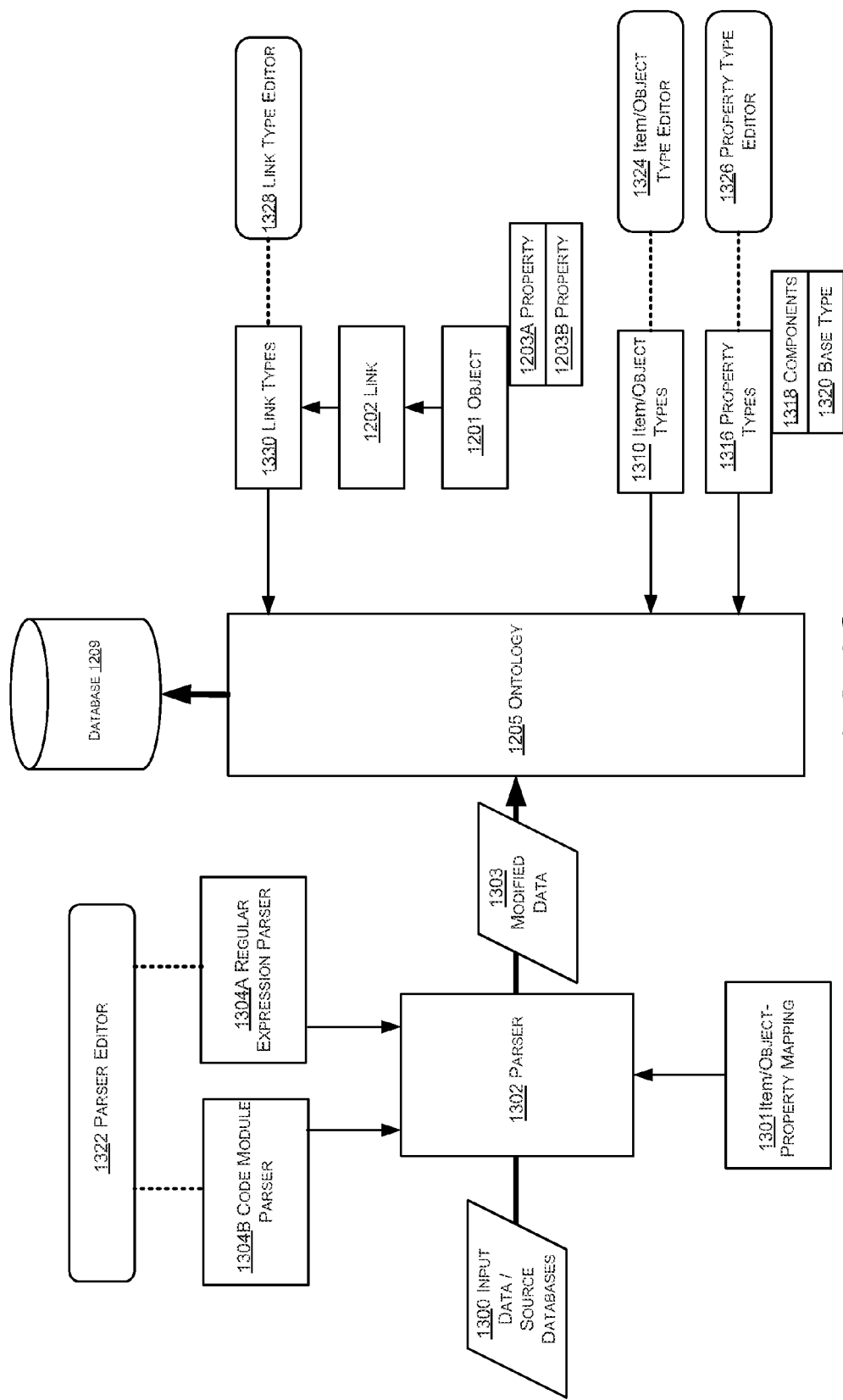
FIG. 3B illustrates an embodiment of a system for creating data in a data store using a dynamic ontology.

FIG. 3B is a block diagram illustrating example components and data that may be used in identifying and storing data according to an ontology. In this example, the ontology may be configured, and data in the data model populated, by a system of parsers and ontology configuration tools. In the embodiment of FIG. 3B, input data 1300 is provided to parser 1302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 1302 is able to read a variety of source input data types and determine which type of data it is reading.

In accordance with the discussion above, the example ontology 1205 comprises stored information providing the data model of data stored in database 1209, and the ontology is defined by one or more data item types 1310, one or more property types 1316, and one or more link types 1330. Based on information determined by the parser 1302 or other mapping of source input information to item type, one or more data items 1201 may be instantiated in the database 209 based on respective determined item types 1310, and each of the items 1201 has one or more properties 1203 that are instantiated based on property types 1316. Two data items 1201 may be connected by one or more links 1202 that may be instantiated based on link types 1330. The property types 1316 each may comprise one or more data types 1318, such as a string, number, etc. Property types 1316 may be instantiated based on a base property type 1320. For example, a base property type 1320 may be "Locations" and a property type 1316 may be "Home."

In an embodiment, a user of the system uses a item type editor 1324 to create and/or modify the item types 1310 and define attributes of the item types. In an embodiment, a user of the system uses a property type editor 1326 to create and/or modify the property types 1316 and define attributes of the property types. In an embodiment, a user of the system uses link type editor 1328 to create the link types 1330. Alternatively, other programs, processes, or programmatic controls may be used to create link types and property types and define attributes, and using editors is not required.

In an embodiment, creating a property type 1316 using the property type editor 1326 involves defining at least one parser definition using a parser editor 1322. A parser definition comprises metadata that informs parser 1302 how to parse input data 1300 to determine whether values in the input data can be assigned to the property type 1316 that is associated with the parser definition. In an embodiment, each parser definition may comprise a regular expression parser 1304A or a code module parser 1304B. In other embodiments, other kinds of parser definitions may be provided using scripts or other programmatic elements. Once defined, both a regular expression parser 1304A and a code module parser 1304B can provide input to parser 1302 to control parsing of input data 1300.

Using the data types defined in the ontology, input data 1300 may be parsed by the parser 1302 determine which item type 1310 should receive data from a record created from the input data, and which property types 1316 should be assigned to data from individual field values in the input data. Based on the item/object-property mapping 1301, the parser 1302 selects one of the parser definitions that is associated with a property type in the input data. The parser parses an input data field using the selected parser definition, resulting in creating new or modified data 1303. The new or modified data 1303 is added to the database 1209 according to ontology 205 by storing values of the new or modified data in a property of the specified property type. As a result, input data 1300 having varying format or syntax can be created in database 1209. The ontology 1205 may be modified at any time using item/object type editor 1324, property type editor 1326, and link type editor 1328, or under program control without human use of an editor. Parser editor 1322 enables creating multiple parser definitions that can successfully parse input data 1300 having varying format or syntax and determine which property types should be used to transform input data 300 into new or modified input data 1303.

The properties, data items, and links (e.g. relationships) between the data items can be visualized using a graphical user interface ("GUI"). For example, FIG. 4 displays a user interface showing a graph representation 1403 of relationships (including relationships and/or links 1404, 1405, 1406, 1407, 1408, 1409, 1410, 1411, 1412, and 1413) between the data items (including data items 1421, 1422, 1423, 1424, 1425, 1426, 1427, 1428, and 1429) that are represented as nodes in the example of FIG. 4. In this embodiment, the data items include person data items 1421, 1422, 1423, 1424, 1425, and 1426; a flight item 1427; a financial account 1428; and a computer data item 1429. In this example, each person node (associated with person data items), flight node (associated with flight data items), financial account node (associated with financial account data items), and computer node (associated with computer data items) may have relationships and/or links with any of the other nodes through, for example, other data items such as payment data items.

Figure 4:
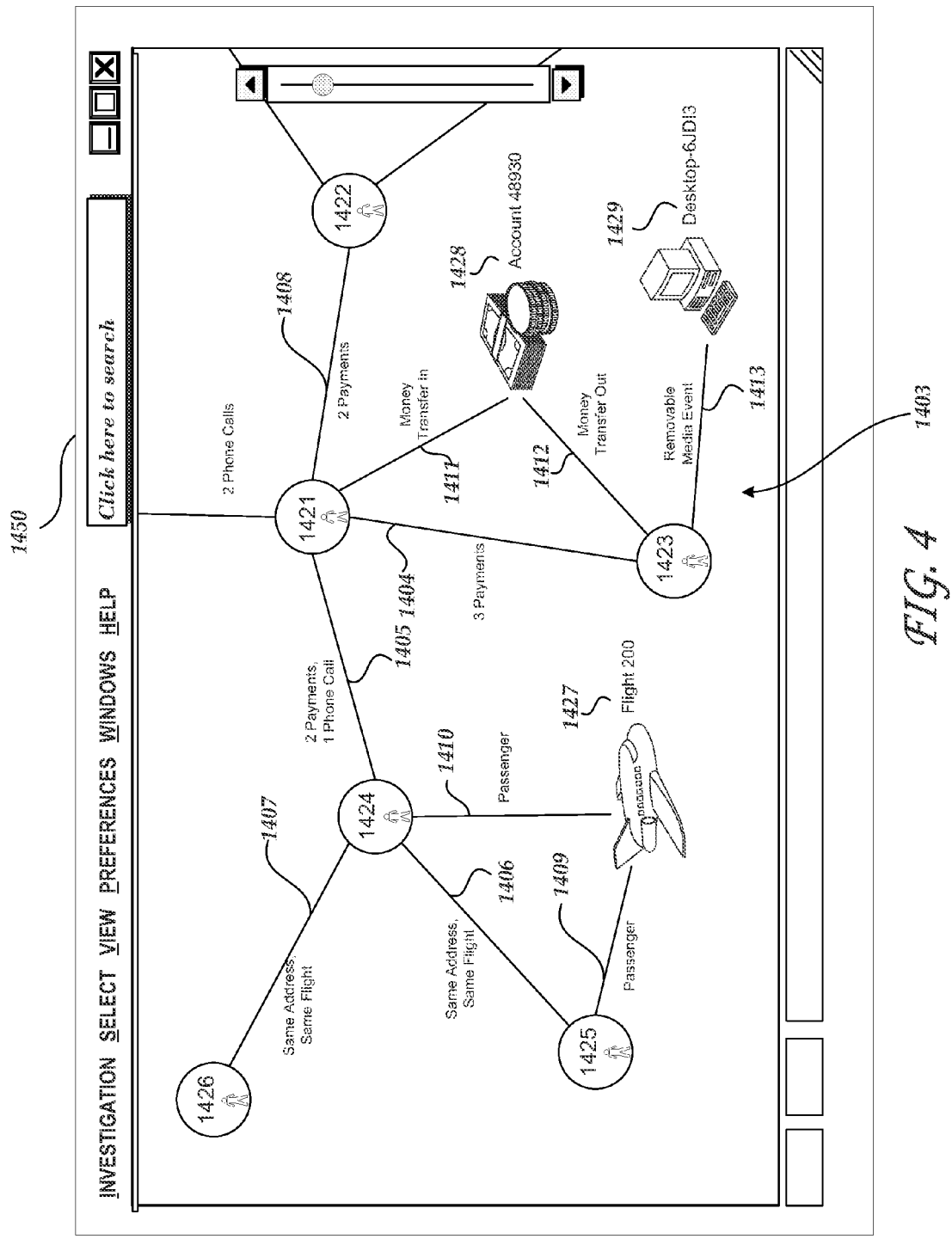
FIG. 4 illustrates a sample user interface using relationships described in a data store using a dynamic ontology.

For example, in FIG. 4, relationship 1404 is based on a payment associated with the individuals indicated in person data items 1421 and 1423. The link 1404 represents these shared payments (for example, the individual associated with data item 1421 may have paid the individual associated with data item 1423 on three occasions). The relationship is further indicated by the common relationship between person data items 1421 and 1423 and financial account data item 1428. For example, link 1411 indicates that person data item 1421 transferred money into financial account data item 1428, while person data item 1423 transferred money out of financial account data item 1428. In another example, the relationships between person data items 1424 and 1425 and flight data item 1427 are indicated by links 1406, 1409, and 1410. In this example, person data items 1424 and 1425 have a common address and were passengers on the same flight data item 1427. In an embodiment, further details related to the relationships between the various items may be displayed. For example, links 1411 and 1412 may, in some embodiments, indicate the timing of the respective money transfers. In another example, the time of the flight associated with the flight data item 1427 may be shown.

Relationships between data items may be stored as links, or in some embodiments, as properties, where a relationship may be detected between the properties. In some cases, as stated above, the links may be directional. For example, a payment link may have a direction associated with the payment, where one person data item is a receiver of a payment, and another person data item is the payer of a payment.

In various embodiments, data items may further include malware analysis metadata and/or links. Such malware analysis metadata may be accessed by the data analysis system for displaying objects and features on the user interface (as described above).

In addition to visually showing relationships between the data items, the user interface may allow various other manipulations. For example, the data items within database 1108 may be searched using a search interface 1450 (e.g., text string matching of data item properties), inspected (e.g., properties and associated data viewed), filtered (e.g., narrowing the universe of data items into sets and subsets by properties or relationships), and statistically aggregated (e.g., numerically summarized based on summarization criteria), among other operations and visualizations.

Implementation Mechanisms

According to an embodiment, the data analysis system and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
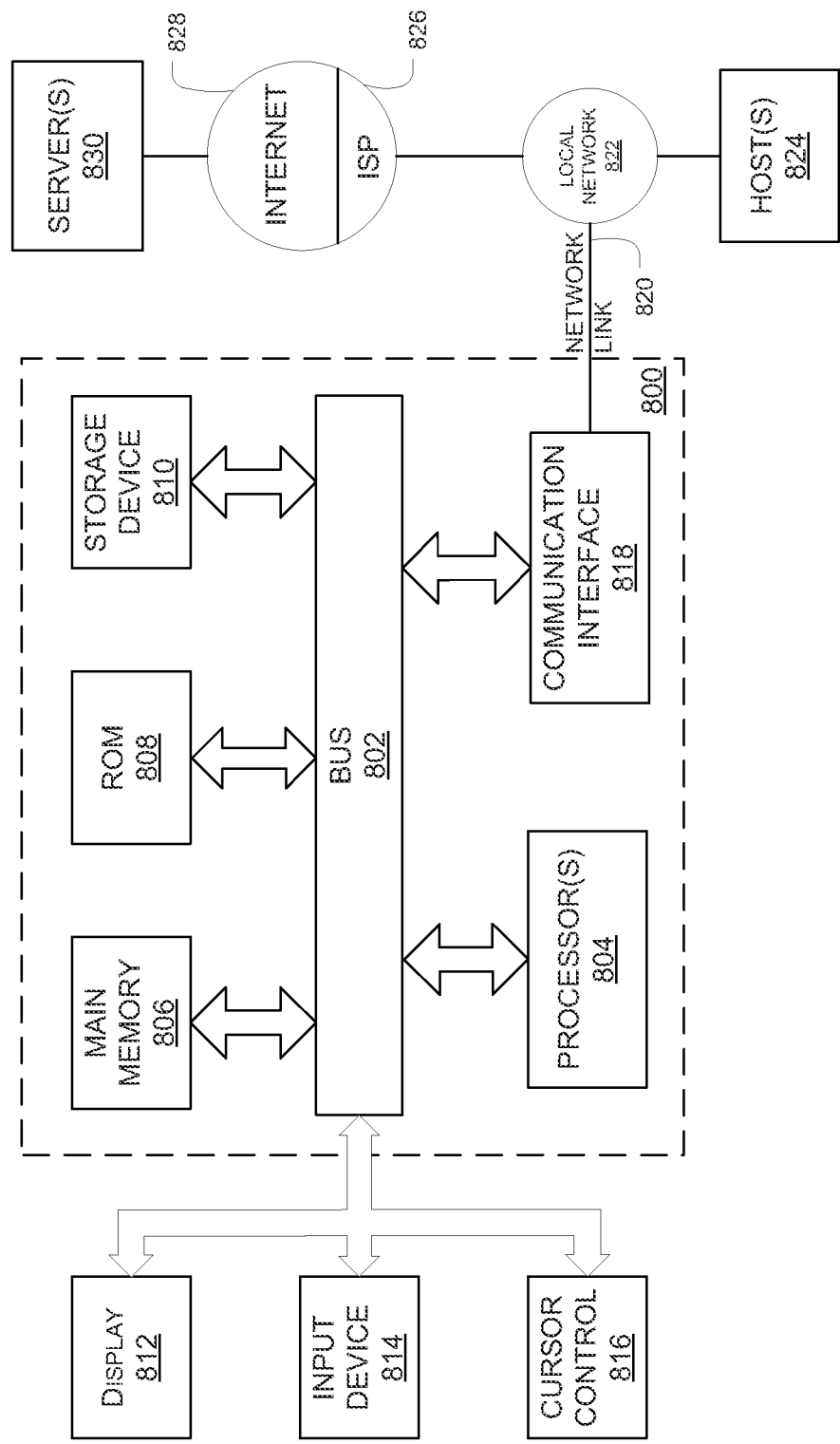
FIG. 5 illustrates a computer system with which certain methods discussed herein may be implemented.

For example, FIG. 5 is a block diagram that illustrates a computer system 800 upon which the various systems and methods discussed herein may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), and/or any other suitable data store, is provided and coupled to bus 802 for storing information (for example, file data items, analysis information data items, submission data items, and/or the like) and instructions.

Computer system 800 may be coupled via bus 802 to a display 812, such as a cathode ray tube (CRT), LCD display, or touch screen display, for displaying information to a computer user and/or receiving input from the user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module, and/or various other types of modules to implement one or more graphical user interface of the data analysis system, as described above. The modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware devices (such as processors and CPUs) may be comprised of connected logic units, such as gates and flip-flops, and/or may be comprised of programmable units, such as programmable gate arrays or processors. Generally, the modules described herein refer to logical modules that may be combined with other modules or divided into sub-modules despite their physical organization or storage. In various embodiments, aspects of the methods and systems described herein may be implemented by one or more hardware devices, for example, as logic circuits. In various embodiments, some aspects of the methods and systems described herein may be implemented as software instructions, while other may be implemented in hardware, in any combination.

As mentioned, computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more modules and/or instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions and/or modules into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. For example, in an embodiment various aspects of the data analysis system may be implemented on one or more of the servers 830 and may be transmitted to and from the computer system 800. For example, submitted malware data items may be transmitted to one of the servers 830, aspects of the basic analysis may be implemented on one or more of the servers 830, and/or aspects of the external analysis may be implemented on one or more of the servers 830. In an example, requests for external analyses of file data items may be transmitted to one or more third-party servers 830 (from, for example, the computer system 800 and/or another server 830 of the system), and analysis data may then be transmitted back from third-party servers 830.

In an embodiment, the data analysis system may be accessible by the user through a web-based viewer, such as a web browser. In this embodiment, the user interfaces of the system may be generated by a server (such as one of the servers 830) and/or the computer system 800 and transmitted to the web browser of the user. The user may then interact with the user interfaces through the web-browser. In an embodiment, the computer system 800 may comprise a mobile electronic device, such as a cell phone, smartphone, and/or tablet. The system may be accessible by the user through such a mobile electronic device, among other types of electronic devices.

Additional Embodiments

While the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
   one or more computer readable storage devices configured to store:
      a plurality of computer executable instructions; and
      a plurality of data items each associated with at least one respective submission event, each submission event indicating at least one of:
         a date the associated data item was submitted, or
         an identifier of a person who submitted the associated data item,
      wherein:
         the plurality of data items include at least a first data item representing a suspected malware file,
         the first data item is associated with a first submission event, and
         the first data item is further associated with a plurality of analysis information items from an analysis of the first data item, wherein the plurality of analysis information items includes at least one of: a payload associated with the first data item, academic analysis information associated with the first data item, file execution information associated with the first data item, third-party analysis information associated with the first data item, a hash of the first data item, a size of the first data item, or a file property associated with the first data item, and one or more hardware computer processors in communication with the one or more computer readable storage devices and configured to execute the plurality of computer executable instructions in order to cause the one or more hardware computer processors to:

receive, via an upload or transmission to the computer system, a second data item, the second data item representing a suspected malware file;

perform an analysis of the second data item to determine one or more characteristics associated with the second data item;

compare at least a first characteristic associated with the second data item with a corresponding first characteristic associated with the first data item;

determine, based at least in part on comparing the first characteristic and the corresponding first characteristic, that the second data item and the first data item match;

in response to determining that the second data item and the first data item match:

associate a second submission event with the first data item, the second submission event being different from the first submission event; and generate a displayable notification that the second data item was previously received, wherein the displayable notification includes an indication of the first submission event associated with the first data item representing a suspected malware file; and generate a user interface including one or more user selectable portions presenting at least: one or more of the analysis information items associated with the first data item, and information regarding the first submission event associated with the first data item.

2. The computer system of claim 1, wherein the indication of the first submission event includes a date that the first data item was previously submitted.

3. The computer system of claim 1, wherein the indication of the first submission event includes at least both of:
a date the first data item was submitted; and
an identifier of the person who submitted the first data item.

4. The computer system of claim 1, wherein the one or more hardware computer processors are further configured to execute the plurality of computer executable instructions in order to cause the one or more hardware computer processors to:
in response to receiving the second data item, generate the second submission event associated with the receipt of the second data item.

5. The computer system of claim 4, wherein the user interface further includes a selectable element, and wherein the one or more hardware computer processors are further configured to execute the a plurality of computer executable instructions in order to cause the one or more hardware computer processors to:

in response to a selection of the selectable element, generate a graphical visualization including at least:
a first graphical representation of the first data item,
a second graphical representation of the first submission event, and
a third graphical representation of the second submission event.

6. The computer system of claim 5, wherein the graphical visualization further includes:
a fourth graphical representation of at least one of the analysis information items.

7. The computer system of claim 6, wherein the graphical visualization further includes:
fifth graphical representation of relationships among the first, second, third, and fourth graphical representations.

8. The computer system of claim 7, wherein the first, second, third, and fourth graphical representations comprise graphical nodes, and the fifth graphical representation comprises graphical edges.

9. The computer system of claim 1, wherein the one or more hardware computer processors are further configured to execute the a plurality of computer executable instructions in order to cause the one or more hardware computer processors to:
initiate an internal analysis of the first data item including at least calculation of a hash of the data item;
initiate an external analysis of the first data item by one or more third party analysis systems; and
associate results of the internal and external analyses with the first data item, the results of the internal and external analyses comprising the analysis information items.

10. The computer system of claim 9, wherein the internal analysis includes analysis performed by the one or more hardware computer processors, and wherein the internal analysis further includes at least one of calculation of an MD5 hash of the first data item, calculation of a SHA-1 hash of the first data item, calculation of a SHA-256 hash of the first data item, calculation of an SSDeep hash of the first data item, or calculation of a size of the first data item.

11. The computer system of claim 9, wherein the external analysis includes analysis performed by at least a second computer system, and wherein the external analysis includes execution of the first data item in a sandboxed environment and analysis of the first data item by a third-party malware analysis service.

12. The computer system of claim 11, wherein any payload provided by the first data item after execution of the first data item in the sandboxed environment is associated with the first data item.

13. The computer system of claim 1, wherein the one or more hardware computer processors are further configured to execute the a plurality of computer executable instructions in order to cause the one or more hardware computer processors to:
in response to receiving the second data item, generate the second submission event associated with the second data item.

14. The computer system of claim 13, wherein the one or more hardware computer processors are further configured to execute the a plurality of computer executable instructions in order to cause the one or more hardware computer processors to:
receive a third data item, the third data item representing another suspected malware file;

generate a third submission event associated with the receipt of the third data item;
compare the third data item with at least one of the first data item or the second data item;
determine that at the third data item and at least one of the first data item or the second data item match;
associate the third submission event with the first data item; and
provide a notification that the third data item was previously received.

15. The computer system of claim 1, wherein comparing the second data item with the first data item comprises:
calculating a hash of the second data item and comparing the calculated hash to a previously calculated hash of the first data item.

16. The computer system of claim 1, wherein the one or more hardware computer processors are further configured to execute the plurality of computer executable instructions in order to cause the one or more hardware computer processors to:
share the first data item and associated analysis information items with a second computer systems via a third computer system.

17. A computer-implemented method comprising:
storing in one or more computer readable storage devices:
a plurality of computer executable instructions; and
a plurality of data items each associated with at least one respective submission event, each submission event indicating at least one of:
a date the associated data item was submitted, or
an identifier of a person who submitted the associated data item,
wherein:
the plurality of data items include at least a first data item representing a suspected malware file,
the first data item is associated with a first submission event, and
the first data item is further associated with a plurality of analysis information items from an analysis of the first data item, wherein the plurality of analysis information items includes at least one of: a payload associated with the first data item, academic analysis information associated with the first data item, file execution information associated with the first data item, third-party analysis information associated with the first data item, a hash of the first data item, a size of the first data item, or a file property associated with the first data item, and
executing, in one or more hardware computer processors in communication with the one or more computer readable storage devices, the plurality of computer executable instructions in order to cause the one or more hardware computer processors to:
receive, via an upload or transmission to the computer system, a second data item, the second data item representing a suspected malware file;
perform an analysis of the second data item to determine one or more characteristics associated with the second data item;
compare at least a first characteristic associated with the second data item with a corresponding first characteristic associated with the first data item;
determine, based at least in part on comparing the first characteristic and the corresponding first characteristic, that the second data item and the first data item match;
in response to determining that the second data item and the first data item match:
associate a second submission event with the first data item, the second submission event being different from the first submission event; and
generate a displayable notification that the second data item was previously received, wherein the displayable notification includes an indication of the first submission event associated with the first data item representing a suspected malware file; and
generate a user interface including one or more user selectable portions presenting at least: one or more of the analysis information items associated with the first data item, and information regarding the first submission event associated with the first data item.

18. The computer-implemented method of claim 17, further comprising executing, with one or more hardware computer processors in communication with the one or more computer readable storage devices, the plurality of computer executable instructions in order to cause the one or more hardware computer processors to:
in response to receiving the second data item, generate the second submission event associated with the receipt of the second data item.

19. The computer-implemented method of claim 17, further comprising executing, with one or more hardware computer processors in communication with the one or more computer readable storage devices, the plurality of computer executable instructions in order to cause the one or more hardware computer processors to:
share the first data item and associated analysis information items with a second computer systems via a third computer system.

20. The computer-implemented method of claim 17, further comprising executing, with the one or more hardware computer processors, the plurality of computer executable instructions in order to cause the one or more hardware computer processors to:
initiate an internal analysis of the first data item including at least calculation of a hash of the data item;
initiate an external analysis of the first data item by one or more third party analysis systems; and
associate results of the internal and external analyses with the first data item, the results of the internal and external analyses comprising the analysis information items.

* * * * *

UNITED STATES PATENT AND TRADEMARK OFFICE
CERTIFICATE OF CORRECTION

PATENT NO. : 9,785,773 B2
APPLICATION NO. : 14/668833
DATED : October 10, 2017
INVENTOR(S) : Matthew Falk It is certified that error appears in the above-identified patent and that said Letters Patent is hereby corrected as shown below:

In the Claims

In Column 27 at Line 65, In Claim 5, change "the a" to --the--.

In Column 28 at Line 24, In Claim 9, change "the a" to --the--.

In Column 28 at Line 55, In Claim 13, change "the a" to --the--.

In Column 28 at Line 63, In Claim 14, change "the a" to --the--.

Signed and Sealed this
Thirteenth Day of February, 2018

Andrei Iancu
*Director of the United States Patent and Trademark Office*